(12) United States Patent
Chiba et al.

(10) Patent No.: US 7,887,894 B2
(45) Date of Patent: Feb. 15, 2011

(54) PACKAGING BAG AND DRYING AGENT WITH MOISTURE ABSORPTION INDICATOR FUNCTION

(75) Inventors: Eisuke Chiba, Tokyo (JP); Tatsuya Ogawa, Tokyo (JP); Hiroshi Koyama, Tokyo (JP); Shinichi Koizumi, Tokyo (JP)

(73) Assignee: Kyodo Printing Co., Ltd., Tokyo (JP)

( * ) Notice: Subject to any disclaimer, the term of this patent is extended or adjusted under 35 U.S.C. 154(b) by 823 days.

(21) Appl. No.: 11/815,545

(22) PCT Filed: Feb. 3, 2006

(86) PCT No.: PCT/JP2006/301858

§ 371 (c)(1),
(2), (4) Date: Aug. 3, 2007

(87) PCT Pub. No.: WO2006/082920

PCT Pub. Date: Aug. 10, 2006

(65) Prior Publication Data

US 2009/0022434 A1    Jan. 22, 2009

(30) Foreign Application Priority Data

Feb. 7, 2005    (JP) .......................... 2005-030999
Apr. 7, 2005    (JP) .......................... 2005-110522

(51) Int. Cl.
*B29D 22/00*    (2006.01)
*B29D 23/00*    (2006.01)
*B32B 1/08*    (2006.01)

(52) U.S. Cl. .................... 428/36.6; 428/36.7; 73/29.04; 116/206

(58) Field of Classification Search ................ 428/36.7, 428/36.6; 73/29.04; 116/206
See application file for complete search history.

(56) References Cited

FOREIGN PATENT DOCUMENTS

| JP | 63-193527 | 12/1988 |
|---|---|---|
| JP | 64-28934 | 2/1989 |
| JP | 1-144345 | 10/1989 |
| JP | 5-85424 | 11/1993 |
| JP | 6-19816 | 3/1994 |

(Continued)

*Primary Examiner*—Michael C Miggins

(57) ABSTRACT

A packaging bag and a drying agent with a moisture absorption indicator function are provided without using a heavy metal harmful to the human body. The packaging bag includes a first packaging material (10) and a second packaging material (20). The first packaging material (10) is provided on an outermost side thereof with a transparent barrier film (12) having a barrier property against water vapor. The second packaging material (20) has a light-reflective or light-absorbing film (24) and a pattern printed layer (23) overlaid on a bag interior side thereof, the pattern printed layer (23) having a printed moisture-absorbing indicator pattern (30). A desiccant-containing resin film (11, 21) which becomes transparent due to moisture absorption is overlaid on a bag interior side of at least one of the first packaging material (10) and the second packaging material (20). The drying agent with a moisture absorption indicator function includes an indicator film layer (70) having a barrier film (75), a pattern printed layer (73) for a moisture absorption indicator, and a moisture-absorbing film (71) containing zeolite, the pattern printed layer (73) and moisture-absorbing film (71) being laminated in this order on the barrier film (75). The drying agent further includes a main desiccant layer (61) and a moisture permeable film (64) that are overlaid on the moisture-absorbing film (71).

10 Claims, 7 Drawing Sheets

FOREIGN PATENT DOCUMENTS

| | | |
|---|---|---|
| JP | 06-262028 | 9/1994 |
| JP | 2004-331855 | 11/2004 |
| WO | 2004/080808 | 9/2004 |
| WO | 2005/053821 | 6/2005 |

US 7,887,894 B2

PACKAGING BAG AND DRYING AGENT WITH MOISTURE ABSORPTION INDICATOR FUNCTION

TECHNICAL FIELD

The present invention relates to a packaging bag with a moisture absorption indicator function and to a drying agent with a moisture absorption indicator function, and, more particularly, to a packaging bag that hermetically stores various kinds of articles to be protected from moisture, such as a food, electronic component, medicine, or document, and that allows visual recognition of a moisture absorbing condition in the packaging bag and a check on the moisture-proof capability of the packaging bag itself, and to a sheet-like, plate-like, or bag-like drying agent that contains a main desiccant in the form of a sheet, film, or desiccant molded body and that has an indicator function for indicating the moisture absorbing condition of such a desiccant.

BACKGROUND ART

Generally, a desiccant made of silica gel, calcium chloride, etc., is packed in a small bag and is enclosed in a package for use with a dry product. This case, however, has inferior workability in packaging. Besides, the silica gel is a white substance, and, therefore, a moisture absorbing condition in the package cannot be checked from the outside.

To deal with the above problem, a desiccant allowing a check on a moisture absorbing condition, that is, a desiccant with a moisture absorption indicator function, is provided. Such a desiccant is made by mixing silica gel with cobalt chloride, and it thus is blue in a dry condition while it turns pink upon absorbing moisture in the air.

An example of a drying agent with a moisture absorption indicator function is, for example, shown in FIG. 10, which is constructed as a bag-like dehumidifying agent with a humidity indicator. This dehumidifying agent is made by storing a moisture absorbent sheet 1 in a bag 4 made of a nonwoven fabric, and a moisture-absorbing humidity indicator 2 covered with a barrier film 3 is pasted on the moisture absorbent sheet 1. The moisture-absorbing humidity indicator 2 contains cobalt chloride, and the barrier film 3 has micropores. When the moisture absorbent sheet 1 absorbs moisture, the moisture-absorbing humidity indicator 2 absorbs moisture through the micropores of the barrier film 3, thus changing the color of the indicator 2 from blue to pink. When the moisture absorbent sheet 1 dries to be regenerated, the moisture-absorbing humidity indicator 2 then changes its color from pink to blue. Through this color change, the moisture absorption condition of the moisture absorbent sheet 1 can be visually recognized (e.g., see patent document 1).

The conventional example of patent document 1, however, uses cobalt chloride as a moisture absorption indicator substance. When the drying agent with a moisture absorption indicator using such a heavy metal as cobalt is disposed of as trash and is incinerated, the heavy metal is finally discharged into the living environment. This is a situation that people hope to avoid as much as possible to protect the environment. A drying agent having a moisture absorption indicator function but without cobalt, therefore, has been developed.

An example of a package having a moisture absorption function is shown in FIG. 11, which is constructed as a cylindrical moisture-absorbing container. This moisture-absorbing container is made by separately injection molding a screw hollow container (outermost layer) 6 and an inner container (innermost layer) 7 and joining both containers together into an integral form. A cap 8 is screwed and tightened on the hollow container 6 to form a storage container. The inner container 7 is molded out of a resin composition having an indicator function for indicating moisture absorptiveness. This resin composition contains a synthetic zeolite 7a mixed therein, causing the inner container 7 to change its color to clear yellow after moisture absorption, which allows an extent of moisture absorption to be checked (e.g., see patent document 2).

Patent document 1: Japanese Utility Model Application Laid-Open Publication No. 64-28934 (entire description, FIG. 1)

Patent document 2: Japanese Patent Application Laid-Open Publication No. 2004-331855 (entire description, FIG. 1)

DISCLOSURE OF THE INVENTION

Problem to be Solved by the Invention

The conventional moisture-absorbing container disclosed in patent document 2 is a package with an indicator function, which package is provided in such a form that the storage container consists of the integrally formed screw hollow container and inner container, and the mouth of the storage container is closed with a cap. The inner container in the storage container is made of a resin composition having an indicator function through means of a color change due to moisture absorption. This package does not allow effective visual recognition of a moisture absorbing condition from the outside.

The present invention has been made in view of the above problem. Accordingly, an object of the present invention is to provide a packaging bag with a moisture absorption indicator function, which packaging bag has the moisture absorption indicator function, does not contains a heavy metal harmful to the human body, and enables visual recognition of such an indicator pattern as characters, numerals, and designs from the outside of the packaging bag by making use of a phenomenon that the transparency of a resin film mixed with a desiccant increases as the resin film absorbs moisture.

Another object of the present invention is to provide a drying agent with a moisture absorption indicator function, which drying agent includes a main desiccant layer, has the moisture absorption indicator function, does not contain a heavy metal harmful to the human body, and enables visual recognition of such an indicator pattern as characters, numerals, and designs from the outside by making use of a phenomenon that the transparency of a resin film mixed with a desiccant increases as the resin film absorbs moisture.

Means for Solving Problem

The present invention solves the above problem, and provides a novel packaging bag with a moisture absorption indicator function and a novel drying agent with a moisture absorption indicator function.

The packaging bag with a moisture absorption indicator function according to the present invention is characterized in that: the packaging bag comprises a first packaging material and a second packaging material joined together while an article storage space being formed therebetween; at least the first packaging material out of the first and second packaging materials includes a transparent barrier film disposed on an outermost side thereof, the transparent barrier film having a barrier property against water vapor; the second packaging material includes a light-reflective or light-absorbing film and a pattern printed layer disposed on a bag interior side of the light-reflective or light-absorbing film, the pattern printed layer including a moisture absorption indicator pattern; and at least one of the first and second packaging materials includes a desiccant-containing resin film that becomes transparent due to moisture absorption, the desiccant-containing resin film being overlaid on a part or the whole of the bag interior side of said at least one of the first and second packaging materials. The second packaging material may further include a barrier film on an outermost side thereof, the barrier film having a barrier property against water vapor. The packaging bag is made by hermetically joining together the four sides of the first and second packaging materials by heat sealing, etc., and protects a stored article from moisture. The packaging bag includes such a packaging bag that is made by heat sealing only three sides of the first and second packaging materials. This packaging bag is used by storing an article in the bag and hermetically joining the remaining one side by heat sealing, etc.

According to a preferred embodiment of the present invention, the desiccant-containing resin film comprises a laminate formed of a desiccant-containing resin layer and a thermoplastic resin layer. The thermoplastic resin layer, for example, should preferably be made of polyolefin.

According to a preferred embodiment of the present invention, the transparent barrier film comprises a base film that is provided thereon with a silica- or alumina-evaporated film, a multilayer-evaporated film of silica and alumina, a silicon nitride-evaporated film, a coating layer of a barrier paint, or a layer made by coating an evaporated film with a barrier paint; and the transparent barrier film has a water vapor transmission rate of 0.001 to 100 $g/m^2/day$. The first packaging material and the second packaging material should preferably be substantially equal in barrier capability.

According to a preferred embodiment of the present invention, the light-reflective film is a film having a metallic luster that comprises an aluminum laminate film, an aluminum-evaporated film, an inorganic-evaporated film, or an inorganic oxide-evaporated film; and the light-reflective film has a water vapor transmission rate of 0.001 to 100 $g/m^2/day$. The above inorganic material or inorganic oxide selected is one that does not put a burden on the environment.

According to a preferred embodiment of the present invention, the light-absorbing film comprises a film coated with or containing a light-absorbing material, or a film laminate having a film coated with or laminated with a light-absorbing material; and the light-absorbing film has a water vapor transmission rate of 0.001 to 100 $g/m^2/day$.

According to a preferred embodiment of the present invention, the pattern printed layer comprises a polyolefin film that is provided on the desiccant-containing resin film or on the light-reflective or light-absorbing film; the moisture absorption indicator pattern is a pattern including a character, numeral, design or a mixture thereof appropriately combined, which is printed on at least one surface of the polyolefin film; and the desiccant-containing resin film becomes transparent as a desiccant contained in the desiccant-containing resin film approaches saturation in moisture absorption, to thereby allow visual recognition of the moisture absorption indicator pattern from the inside or outside of the packaging bag. Alternatively, the pattern printed layer is provided on the desiccant-containing resin film or on the light-reflective or light-absorbing film; the moisture absorption indicator pattern is a pattern including a character, numeral, design or a mixture thereof appropriately combined, which is printed on at least one surface of the desiccant-containing resin film or of the light-reflective or light-absorbing film. The moisture absorption indicator pattern indicates the limit of preservation of an article against moisture. The moisture absorption indicator pattern, for example, may be characters reading "reaching the preservation limit", a combination of such characters with designs, or a combination of characters, numerals, etc., having different print densities that can be visually recognized in the order of a degree of density according to the moisture absorption condition of the desiccant-containing resin film to allow a check on the preservation limit step by step. The polyolefin film printed with the moisture absorption indicator pattern may be provided with a printed layer providing a background color that is formed on the outer surface of the polyolefin film, which outer surface is opposite to the surface bearing the moisture absorption indicator pattern.

According to a preferred embodiment of the present invention, the desiccant-containing resin film contains at least one desiccant selected form zeolite, silica gel, and alumina.

According to a preferred embodiment of the present invention, the first packaging material is located on a front side of an article stored in the packaging bag, and the second packaging material is located on a back side of the article.

According to a preferred embodiment of the present invention, the light-absorbing film is a film printed with black ink, or is a film made of a thermoplastic resin having carbon black mixed therein.

According to a preferred embodiment of the present invention, the desiccant-containing resin film is mixed or coated with a light-scattering material, or the transparent barrier film is coated with a light-scattering material.

The packaging bag according to the present invention is provided in the form of a three-sided sealed bag, a four-sided sealed bag, a gadget bag, a standing pouch, etc., that is formed of the first packaging material and the second packaging material and that has the moisture absorption indicator function. The packaging bag may be provided in such a form that article storage portions are formed on both sides of the second packaging material or at two locations thereon, or that the article storage portion of the second packaging material is formed into a box shape or cylindrical shape.

The drying agent with a moisture absorption indicator function according to the present invention is characterized in that the drying agent comprises: an indicator film layer including a barrier film, a pattern printed layer having a moisture absorption indicator pattern printed thereon, and a moisture-absorbing film becoming transparent due to moisture absorption, the pattern printed layer and moisture-absorbing film being laminated in this order on the barrier film; a main desiccant layer; and a moisture permeable film, the main desiccant layer and the moisture permeable film being provided on the moisture-absorbing film of the indicator film layer. The barrier film may be made of an aluminum laminate film, aluminum-evaporated film, inorganic-evaporated film, or inorganic oxide-evaporated film. The pattern printed layer is printed with the moisture absorption indicator pattern of characters, numerals, designs, or a mixture thereof appropriately combined. The main desiccant layer is made by mixing a thermoplastic resin with a desiccant of silicon dioxide (silica gel), calcium oxide, calcium chloride, sulfate compound, barium oxide, activated carbon, clay compound, etc. The main desiccant layer may be transparent when not reaching saturation in moisture absorptiveness, but does not always need to be transparent. The main desiccant layer is acceptable if it becomes transparent at the point that the moisture absorptiveness of the main desiccant layer has reached saturation.

According to a preferred embodiment of the present invention, a moisture permeability control film is overlaid on the moisture-absorbing film, the moisture permeability control film controlling the time that elapses before the moisture absorptiveness of the moisture-absorbing film reaches saturation. The moisture permeability control film should preferably be made of a thermoplastic resin such as polyethylene terephthalate (PET), polyethylene (PE), polypropylene (PP), polyvinyl chloride (PVC), nylon (Ny), ethylene vinyl acetate (EVA), polystyrene (PS), ethylene vinyl alcohol copolymer (EVOH), or polyvinylidene chloride (PVDC), or cellophane. The moisture permeability control film controls the moisture absorbing rate of the moisture-absorbing film to prevent such a situation that the moisture absorptiveness of the moisture-absorbing film reaches saturation before the moisture absorptiveness of the main desiccant layer reaches saturation to allow the visual recognition of the moisture absorption indicator from the outside at that point. A moisture absorptiveness retaining time of the moisture-absorbing film is determined according to the main desiccant layer's moisture absorption capability, such as a moisture absorptiveness retaining time or the like.

According to a preferred embodiment of the present invention, a space is formed between the main desiccant layer and the moisture-absorbing film or between the main desiccant layer and the moisture permeability control film to provide a bag-like portion.

According to a preferred embodiment of the present invention, the main desiccant layer comprises a transparent desiccant film or a transparent desiccant molded body.

According to a preferred embodiment of the present invention, the main desiccant layer comprises a granular or tabular desiccant or a deliquescent desiccant, and the moisture permeable film and the moisture-absorbing film or the moisture permeable film and the moisture permeability control film are sealed together at peripheries thereof to form a bag-like portion to enclose therewithin the granular or tabular desiccant or the deliquescent desiccant. The granular desiccant is provided as silica gel, etc., the tabular desiccant may be provided as a transparent resin containing silica gel, etc., and the deliquescent desiccant is provided as calcium chloride, magnesium chloride, potassium oxide, sodium oxide, alunite, magnesium sulfate, phosphorus oxide, etc. The desiccant stored in the bag-like portion should preferably be transparent or become transparent when the moisture absorptiveness of the desiccant reaches saturation, but a nontransparent desiccant is also acceptable if the nontransparent desiccant is arranged in such a way that the indicator pattern at the back of the desiccant can be visually recognized through gaps between the grains of the desiccant.

According to a preferred embodiment of the present invention, the moisture-absorbing film comprises a laminate formed of a desiccant-containing resin layer and a thermoplastic resin.

According to a preferred embodiment of the present invention, the moisture-absorbing film contains at least one desiccant selected from zeolite, silica gel, and alumina.

According to a preferred embodiment of the present invention, the moisture permeability control film is a transparent film, and has a water vapor transmission rate of 0.01 to 5,000 g/m²/day.

Effect of the Invention

A packaging bag with a moisture absorption indicator function according to the present invention includes a first packaging material and a second packaging material, the first and second packaging materials being joined together while an article storage space being formed therebetween. At least the first packaging material out of the first and second packaging materials includes a transparent barrier film disposed on the outermost side thereof, the transparent barrier film having a barrier property against water vapor. The second packaging material includes a light-reflective or light-absorbing film and a pattern printed layer disposed on the bag interior side of the light-reflective or light-absorbing film, the pattern printed layer including a moisture-absorbing indicator pattern. At least one of the first and second packaging materials includes a desiccant-containing resin film that becomes transparent due to moisture absorption, the desiccant-containing resin film being overlaid on a part or the whole of the bag interior side of the one of the first and second packaging materials. The desiccant-containing resin film increases its transparency with increasing moisture absorption. When the desiccant-containing resin film is overlaid on the bag interior side of the first packaging material, therefore, the desiccant-containing resin film gradually turns transparent, which allows a check on a stored article and visual recognition of the moisture absorption indicator pattern of the pattern printed layer having an indicator function, thus leading to a confirmation that the moisture absorbing capability of the packaging bag has reached its limit. When the desiccant-containing resin film is overlaid on the bag interior side of the second packaging material, the stored article can be checked in advance, and the desiccant-containing resin film gradually turns transparent due to moisture absorption, which allows visual recognition of the moisture-absorbing indicator pattern of the pattern printed layer, thus leading to a confirmation that the moisture absorbing capability of the packaging bag has reached its limit. When the desiccant-containing resin film is overlaid on both first and second packaging materials, the stored article cannot be visually recognized from the outside. When the moisture absorptiveness of the desiccant-containing resin films on both packaging materials reaches saturation, however, the moisture absorption indicator pattern of the pattern printed layer becomes visible, at which point the stored article can be protected from moisture. Overlaying the desiccant-containing resin film on both first and second packaging materials offers an advantage of being able to maintain the moisture absorption capability in the packaging bag for a long time. In addition, if a pinhole is present on the packaging bag, the desiccant-containing resin film overlaid on the first packaging material and/or the second packaging material becomes transparent to cause the moisture absorption indicator pattern to appear. This facilitates determination on the quality of the packaging bag, and is very effective in managing the contents of the packaging bag.

When the desiccant-containing resin film comprises a laminate formed of a desiccant-containing resin layer and a thermoplastic resin layer, desired moisture absorption capability is maintained and the mechanical strength of the desiccant-containing resin film is sustained as well even when the desiccant-containing resin film is overlaid on the first packaging material. This makes the desiccant-containing resin film applicable to a variety of uses.

When the transparent barrier film comprises a film that is provided thereon with a silica- or alumina-evaporated film, a multilayer-evaporated film of silica and alumina, a silicon nitride-evaporated film, a coating layer of a barrier paint, or a layer made by coating an evaporated film with a barrier paint, and has moisture barrier characteristics in terms of water vapor transmission rate of 0.001 to 100 g/m²/day, the barrier capability of the first packaging material and of the second packaging material can be determined to be substantially equal, and the moisture-proof capability of the transparent barrier film can be selected according to required moisture absorption capability. The packaging bag capable of maintaining high moisture-proof capability, therefore, can be provided.

When the light-reflective film is a film having a metallic luster that comprises an aluminum laminate film, an aluminum-evaporated film, an inorganic-evaporated film, or an inorganic oxide-evaporated film, or the light-absorbing film comprises a film coated with or containing a light-absorbing material or a film laminate having a film coated with or laminated with a light-absorbing material, and the light-reflective or light-absorbing film has a water vapor transmission rate of 0.001 g/m$^2$/day to 100 g/m$^2$/day, the light-absorbing or light-reflective film creates a greater color difference between the pattern printed layer overlaid on the bag interior side and the moisture absorption indicator pattern. As a result, the visibility of the moisture absorption indicator pattern is fine when light permeability increases as a result of moisture absorption by the desiccant-containing resin film. In addition, the barrier capability of the first packaging material and of the second packaging material can be determined to be substantially equal, and the moisture-proof capability of the transparent barrier film can be selected according to required moisture absorption capability. Thus, the packaging bag capable of maintaining high moisture-proof capability can be provided.

When the pattern printed layer comprises a polyolefin film that is provided on the desiccant-containing resin film or on the light-reflective or light-absorbing film, and the moisture absorption indicator pattern is a pattern including a character, numeral, design or a mixture thereof appropriately combined, which is printed at least on one surface of the polyolefin film, or when the pattern printed layer is provided on the desiccant-containing resin film or on the light-reflective or light-absorbing film, and the moisture-absorbing indicator pattern may be a pattern including a character, numeral, and design or a mixture thereof appropriately combined, which is printed at least on one surface of the desiccant-containing resin film or of the light-reflective or light-absorbing film, the desiccant-containing resin film becomes transparent as moisture absorption by a desiccant contained in desiccant-containing resin film approaches saturation, so that the moisture absorption indicator pattern can be visually recognized from the outside of the packaging bag once the desiccant reaches its moisture absorption limit. This offers an advantage of facilitating the management of contents for protection from moisture. The moisture absorption indicator pattern indicates the limit of preservation of an article. The moisture absorption indicator pattern, for example, may be a written expression "reaching the preservation limit", a combination of such an expression with designs, or a combination of characters, numerals, etc., having different print densities that can be visually recognized in the order of a degree of density to allow a check on the preservation limit step by step. Such a moisture absorption indicator pattern is effective in managing the contents. The pattern printed layer may be provided with a printed layer having a background color that is formed on the outer surface of the pattern printed layer, which outer surface is opposite to the surface bearing the moisture absorption indicator pattern. This increases an optical density difference to improve visual recognition of the moisture absorption indicator pattern.

When the desiccant-containing resin film contains at least one or more of substances selected from zeolite, silica gel, and alumina as a desiccant, the desiccant can be properly selected from these substances according to a use, and the selection can be made to adopt a substance not harmful to the human body. The transparency of the desiccant-containing resin film is enhanced when the moisture absorptiveness of the desiccant-containing resin film reaches saturation, and the light-reflective film or light-absorbing film is overlaid on the outside of the desiccant-containing resin film in the second packaging material to ensure sufficient optical density difference. This results in an advantage that the desiccant-containing resin film does not prevent recognition of the moisture absorption indicator pattern even if this film slightly colored as long as the desiccant-containing resin film retains transparency when reaching saturation in its moisture absorptiveness. When the desiccant-containing resin film contains an absorbent made of calcium oxide, calcium chloride, sulfate compound, barium oxide, activated carbon, clay compound, etc., to an extent that does not damage the effect of the present invention, the desiccant-containing resin film comes to have increased purpose-oriented absorbing capability.

When both first and second packaging materials are provided with the desiccant-containing resin film and the moisture-proof capability of the first packaging material is lower than that of the second packaging material, the desiccant-containing resin film on the first packaging material becomes transparent first to allow visual recognition of a stored article, and then the desiccant-containing resin film on the second packaging material gradually becomes transparent to allow visual recognition of the moisture absorption indicator pattern on the underlayer of the desiccant-containing resin film. Forming the desiccant-containing resin film on both first and second packaging materials allows the maintenance of moisture absorption capability for a long time, and enables the moisture-proof management of a stored article on a step by step basis.

When the first packaging material or the second packaging material is formed into a shape having storage portions at least at two locations, the moisture absorption condition of a compound, etc., in the storage portion can be checked in such a case where the compound, etc., which is moisture-degradable, is mixed with a liquid just before the actual use of a resulting mixture.

When the first packaging material is arranged to be at the front side of an article stored in the packaging bag and the second packaging bag is arranged to be at the back side of the article, a case is prevented where the moisture absorption indicator pattern covers the surface of the stored article to make impossible checking on the stored article or spoil the design of the packaging bag.

When the light-absorbing film is a film printed with black ink, or is a film made of a thermoplastic resin having carbon black mixed therein, the contrast of color of the moisture absorption indicator pattern to that of the pattern printed layer is emphasized to enhance the visibility of the pattern.

When the desiccant-containing resin film is mixed or coated with a light-scattering material, or the transparent barrier film is coated with a light-scattering material, the visibility of the moisture absorption indicator pattern is further enhanced when the moisture absorptiveness of the desiccant in the desiccant-containing resin film reaches saturation. The light-scattering material should preferably be such a globular substance as glass beads, silica, and acryl beads.

A drying agent with a moisture-absorbing indicator function according to the present invention comprises an indicator film layer including a barrier film, a pattern printed layer having a moisture absorption indicator pattern printed thereon, and a moisture-absorbing film that becomes transparent due to moisture absorption, the pattern printed layer and moisture-absorbing film being laminated in this order on the barrier film. The drying agent further includes a main desiccant layer and a moisture permeable layer that are provided on the moisture-absorbing film of the indicator film layer. This configuration offers an advantage that the moisture absorption indicator pattern of the pattern printed layer is made visually recognizable through the acquirement of transparency by the moisture-absorbing film due to moisture absorption without using cobalt chloride containing a heavy metal that is a substance harmful to the human body, and that the moisture absorption condition of the main desiccant layer can be indicated by the recognizable indicator pattern. The configuration also offers an advantage that the pattern printed layer for the moisture absorption indicator is formed on one side of the moisture-absorbing film, and is coated with the barrier film to allow indication of the condition of moisture absorption from the main desiccant layer side.

When the moisture absorptiveness of the main desiccant layer reaches saturation, the moisture absorptiveness of a desiccant mixed into the moisture-absorbing film also reaches saturation to make the desiccant transparent, which allows visual recognition of the moisture absorption indicator pattern from the outside of the drying agent. This drying agent offers an advantage that just putting the drying agent into a container, etc., facilitates management of a stored article in the container in protection from moisture. The moisture absorption indicator pattern indicates the limit of preservation of an article, and may be, for example, a written expression "reaching the preservation limit", a combination of such an expression with designs, or a combination of characters, numerals, etc., having different print densities that can be visually recognized in the order of a degree of density to allow a check on the preservation limit step by step. This enables effective management of a content article.

In one embodiment, a moisture permeability control film may be overlaid on the moisture-absorbing film, the moisture permeability control film controlling a time for the moisture absorptiveness of the moisture-absorbing film to take to reach saturation. According to this embodiment, the moisture permeability control film serves as an interposed film, enabling such control that moisture passing through the moisture permeable film is absorbed first by the main desiccant layer, and, after the moisture absorptiveness of the main desiccant layer has reached saturation, the moisture-absorbing film is saturated with moisture passing through the moisture permeability control film. The indicator pattern, therefore, becomes visually recognizable after the moisture absorptiveness of the main desiccant layer has reached saturation.

When a space is formed between the main desiccant layer and the moisture-absorbing film or between the main desiccant layer and the moisture permeability control film to provide a bag-like portion, a sheet bearing an indication of a desiccant can be stored in the bag-like portion.

When the main desiccant layer is a transparent desiccant film, the main desiccant layer is formed into a shape of a film or sheet. When the main desiccant layer is a transparent desiccant molded body, the main desiccant layer is formed into a desired shape of a plate, stick, etc. A drying agent that is shaped in accordance with such a shape of the desiccant is stored in a container or package of various shapes, where the drying agent can indicate drying capability in the container or package.

When the peripheries of the moisture permeable film and the moisture-absorbing film or of the moisture permeable film and the moisture permeability control film are sealed together to form a bag-like portion, and a granular or tabular desiccant or a deliquescent desiccant is enclosed in the bag-like portion to provide the main desiccant layer, the drying agent comes to have improved moisture absorption capability.

When the moisture-absorbing film comprises a laminate formed of a desiccant-containing resin layer and a thermoplastic resin, the mechanical strength of the moisture-absorbing film becomes sufficient and the surface smoothness of the moisture-absorbing film is improved.

When a desiccant mixed into the moisture-absorbing film contains at least one or more substances selected from zeolite, silica gel, and alumina, the desiccant does not have a negative effect on the human body when it is disposed of in the living environment.

When the moisture permeability control film is a transparent film that has a water vapor transmission rate of 0.01 to 5,000 $g/m^2/day$, the moisture absorption capability required as the drying agent can be determined desirably through the moisture permeability control film.

BEST MODE FOR CARRYING OUT THE INVENTION

Embodiments of a packaging bag with a moisture absorption indicator function according to the present invention will now be described with reference to the drawings. In describing the embodiments of the packaging bag with the moisture absorption indicator function according to the present invention, the packaging bag is described as a packaging bag with a film having a drying function, which film is provided on the front side of the packaging bag (front side of a stored article), and is described as a separate packaging bag with a film having a drying function, which film is not provided on the front side but on the back side of the packaging bag (back side of a stored article).

Figure 1A:
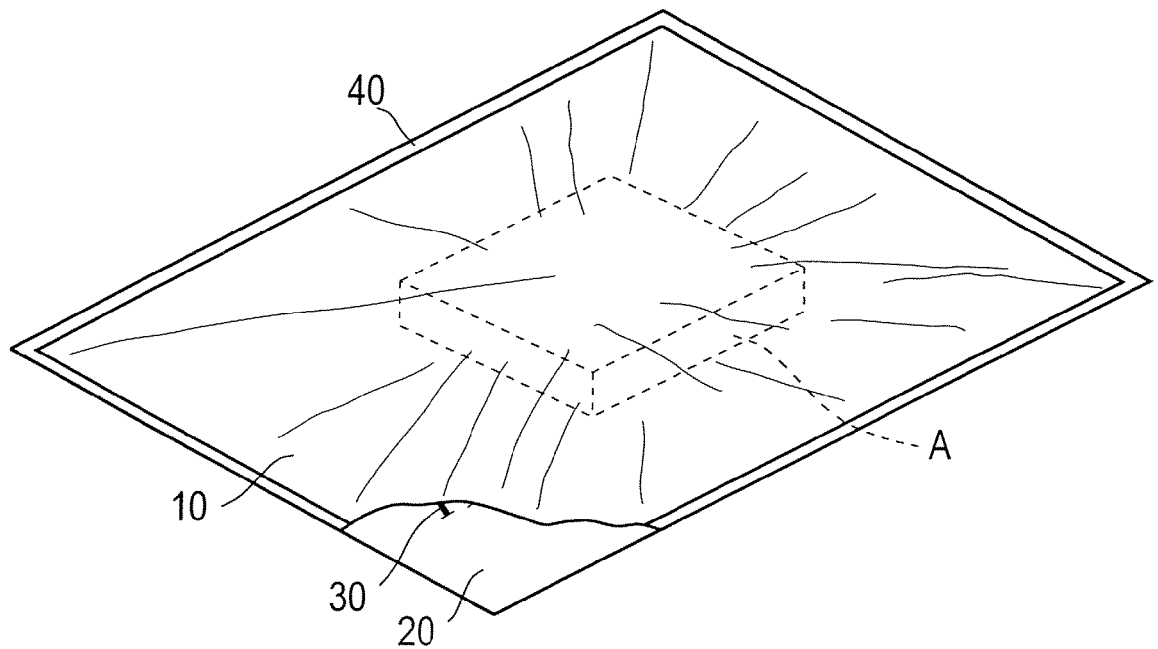
FIG. 1(a) is a partially cutout perspective view of one embodiment of a packaging bag with a moisture absorption indicator function according to the present invention.
Figure 1B:
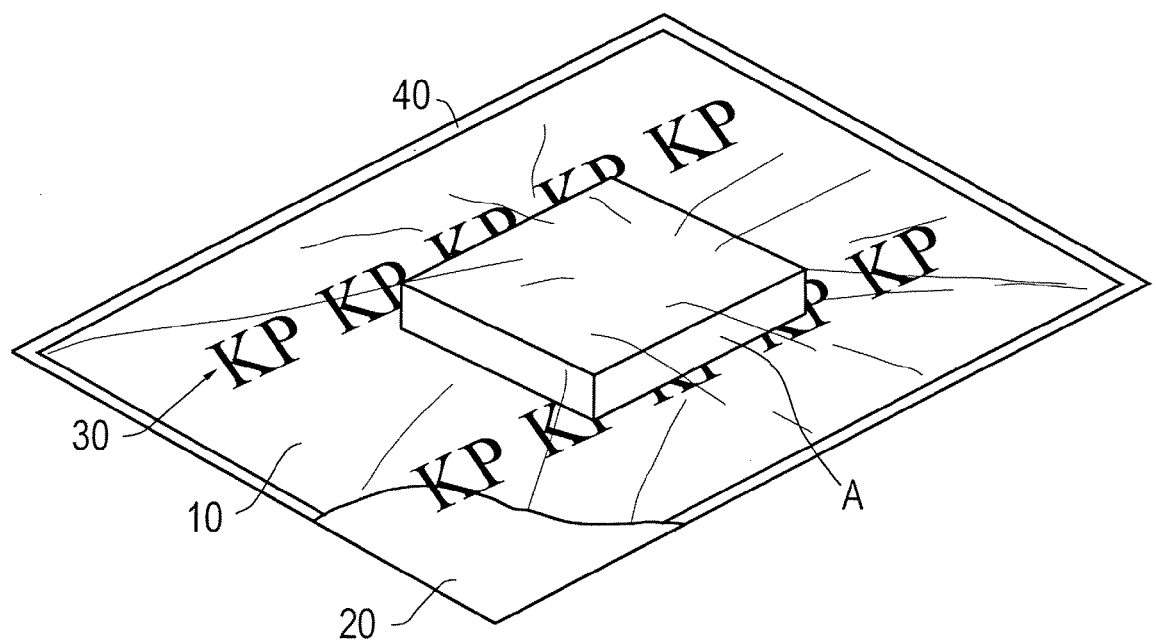
FIG. 1(b) is a partially cutout perspective view of the packaging bag on which a moisture absorption indicator pattern has appeared when the moisture absorptiveness of a desiccant of a desiccant-containing resin film has reached saturation.

FIGS. 1(a) and 1(b) are partially cutout perspective views of one embodiment of the packaging bag with the moisture absorption indicator function according to the present invention. FIG. 1(a) shows a state of maintenance of moisture absorptiveness in the packaging bag, and FIG. 1(b) shows a state of saturation of moisture absorptiveness in the packaging bag, where a moisture absorption indicator pattern 30 can be visually recognized. The packaging bag of this embodiment includes a first packaging material 10 on the front side of the packaging bag, which packaging material 10 has a desiccant-containing resin film, and a second packaging material 20. The peripheries of the first and second packaging materials 10 and 20 are sealed together with a heat seal portion 40 to form a four-side sealed bag. An article A is stored in a space (bag interior) between the first packaging material 10 and the second packaging material 20. This embodiment offers various forms shown in FIGS. 2(a) to 2(d). Each of the packaging bags in these various forms is a packaging bag with a moisture absorption indicator function having moisture-proof capability, which is made by heat sealing three sides of the first and second packaging materials 10 and 20 to join them together, each packaging material being cut into a rectangular shape of a desired size, storing the article A in the joined package, then heat sealing the remaining one side of the first and second packaging materials 10 and 20 to complete a hermetic package.

Respective preferred forms of FIGS. 2(a) to 2(d) will be described in order. According to the form of FIG. 2(a), the packaging bag includes the first packaging material 10 and the second packaging material 20. The first packaging material 10 is a film laminate formed of a desiccant-containing resin film 11 and a transparent barrier film 12. The transparent barrier film 12 covers the outermost side of the first packaging material 10. The second packaging material 20 is a film laminate formed of a thermoplastic resin film (sealant film) 22, a pattern printed film 23, and a light-reflective or light-absorbing film 24. The desiccant-containing resin film 11 is made of a resin composition containing zeolite, and one or both surfaces of the desiccant-containing resin film 11 is/are laminated with polyolefin (e.g., LLDPE) by a coextrusion process when the desiccant-containing resin film 11 is molded. Laminating one or both surfaces of the zeolite-containing resin composition with a polyolefin resin layer improves the strength of the first packaging material 10, and gives the zeolite-containing resin composition a flat film surface, which emphasizes the transparency of the transparent barrier film 12.

The transparent barrier film 12 of the first packaging material 10 is made of a polyester film, for example, it is made of a polyethylene terephthalate (PET) film. The transparent barrier film 12 should preferably be made of a film having a barrier property against water vapor or gas, such as a silica- or alumina-evaporated film, film sputtered with a nitride, K-coated film (film coated with vinylidene chloride-vinyl chloride copolymer latex), OPP film (biaxially oriented polypropylene film), or OPE film (oriented polyethylene film). The transparent barrier film 12 may also be made of a coextruded film, an engineering plastic film such as polyimide, polycarbonate, PPS (polyphenylene sulfide) or PES (polyether sulfide), a fluorocarbon resin film such as PTFE (polytetrafluoroethylene), or the like. The transparent barrier film 12 should desirably have moisture barrier characteristics in terms of water vapor transmission rate of 0.001 to 100 $g/m^2/day$.

The desiccant-containing resin film 11 is manufactured in the following way. First, a base resin is mixed with 5 to 80% of zeolite by weight and formed into a film shape after adding an additive, such as an ethylene-acrylic ester-maleic anhydride copolymer or the like, at a mixture ratio of 1 to 20% by weight to enhance an affinity of the base resin and zeolite. In forming the desiccant-containing resin film, one or both surfaces of the zeolite-containing resin are laminated with polyolefin (e.g., LLDPE) by the coextrusion process. This is done for the following reason. A single zeolite film, which substantially consists of the base resin and the zeolite, has a rough film surface because the base resin and zeolite are in a mixed state at the film surface, and the rough film surface lowers light transmittance. The zeolite film as a single body shows an extremely high absorption rate in absorbing moisture in the air to have difficulty in controlling a saturation reaching time, and is inferior in film strength as well. To deal with this problem, the zeolite film is laminated with a film made of polyolefin, etc., by the coextrusion process. This enhances the strength of the film as a whole, reduces the surface roughness of the film, inhibits the separation of zeolite crystal aggregate, and exerts an effect of emphasizing the acquirement of transparency by the zeolite film due to moisture absorption. In addition, film lamination enables control of a moisture absorption rate in accordance with the material and thickness of the film. The polyolefin used here is transparent. The mixture ratio of zeolite should preferably be about 40 to 80% by weight, and further preferably be about 50 to 80% by weight.

The base resin is provided as a thermoplastic resin, for which one or more resins are selected from, for example, LDPE (low density polyethylene), LLDPE (linear low density polyethylene), PP (polypropylene), and various copolymers, such as ionomer, EAA, EMAA, EVA, EEA, EMA, EMMA, etc. and are used alone or in a mixture form. The selection from such resins is made so as to include a resin having a high MFR (melt flow rate), preferably having an MFR of 10 (g/10 minutes) or higher as measured under the conditions of a temperature of 190° C. and a load of 21.18 N.

Zeolite is a powdered inorganic porous substance having a pore diameter of 3 to 10 Å, and is used as a preferable absorbent. A zeolite having an average particle diameter of, for example, about 10 μm is preferable. The zeolite is a porous particulate substance with polarity that is used to separate substances depending on a size of a molecule, and has a structure with uniform fine pores, so that the zeolite absorbs small molecules entering the cavities of the fine pores to act as a kind of sieve. In addition to the zeolite, the desiccant may also contain at least one or more of substances selected from calcium oxide, silica gel, calcium chloride, sulfate compound, barium oxide, alumina, activated carbon, and clay compound, but should preferably be made of a synthetic or natural zeolite.

The second packaging material 20 will now be described. The second packaging material 20 is a film laminate located at the back side of the stored article A. The second packaging material 20 includes the thermoplastic resin film 22 on the bag interior side thereof, the pattern printed film 23, and the light-reflective or light-absorbing film 24. The pattern printed film 23 and light-reflective or light-absorbing film 24 are laminated in this order on the outer surface side of the thermoplastic resin film 22. The thermoplastic resin film 22 may be laminated following lamination of the pattern printed film 23 and light-reflective or light-absorbing film 24, or these three films may be laminated by using the coextrusion method.

As the thermoplastic resin film 22, one or more resins is/are selected from LDPE (low density polyethylene), LLDPE (linear low density polyethylene), PP (polypropylene), PS (polystyrene), PMMA (polymethyl methacrylate), nylon, polyester (PET, PBT, PEN), PAN (polyacrylonitrile), and various copolymers such as ionomer, EAA, EMAA, EVA, EVOH, EEA, EMA, EMMA, etc, and is used alone or are used as in a mixture form. Fluorocarbon resins, such as PTFE, can also be used. For the formation of the thermoplastic resin film 22, a preferable material is selected when the first packaging material 10 and second packaging materials 20 are bonded and heat sealed together at their peripheries to form a hermetical package.

The pattern printed film 23 is made of, for example, a polyolefin film to enhance the mechanical strength of the second packaging material 20. The pattern printed film 23 has the moisture absorption indicator pattern 30 printed on one surface thereof, which indicator pattern 30 serves as a humidity indicator. The moisture absorption indicator pattern 30 is printed on the surface of the pattern printed film 23 that is stuck to the thermoplastic resin film 22. The ink used for printing the moisture absorption indicator pattern 30 contains a pigment or dye at a weight ratio to the resin of 0.01 to 200% by weight, and has a film thickness of 0.3 to 100 μm.

The light-reflective or light-absorbing film 24 is provided as either a light-reflective film or a light-absorbing film, and is formed to create a clear optical density difference with regard to the moisture absorption indicator pattern 30. The light-reflective film 24 is made of a metal foil or metal evaporated film having light reflectivity, such as an aluminum foil, aluminum-evaporated film, tin foil, tin-evaporated film, nickel foil, or the like.

The light-absorbing film 24 is made of a film printed with black ink or of a film molded from a thermoplastic resin having carbon black mixed therein. The surface of the pattern printed film 23 that is opposite to the surface bearing the moisture absorption indicator pattern 30 may be painted with ink having a color of any one or a mixture of white, black, red, blue, green, yellow, indigo, cyan, and magenta, which color functions as a background color for the moisture absorption indicator pattern 30, so that the pattern printed film 23 serves also as the light-absorbing film 24. This background color provides a clear optical density difference at the time of visual recognition of the moisture absorption indicator pattern 30, and the tint of the background color is determined in view of the tint of the moisture absorption indicator pattern 30. Obviously, the light-absorbing film 24 may be painted with ink having a color of any one or a mixture of white, black, red, blue, green, yellow, indigo, cyan, and magenta.

In the packaging bag of this embodiment, the first packaging material 10 is in a whitish turbid state before moisture absorption by the desiccant-containing resin film 11 thereof when the article A is stored in the packaging bag, as shown in FIG. 1(a). The stored article A and the moisture absorption indicator pattern 30, therefore, cannot be visually recognized from the outside at the side of the first packaging material 10. As the desiccant of the desiccant-containing resin film 11 absorbs moisture to cause the moisture absorption capability of the desiccant to approach saturation, the desiccant-containing resin film 11 gradually turns transparent to allow the visual recognition of the stored article A and of the moisture absorption indicator pattern 30 as well. When the moisture absorptiveness of the desiccant of the desiccant-containing resin film 11 reaches saturation completely, the desiccant-containing resin film 11 becomes transparent substantially, as shown in FIG. 1(b), which allows visual recognition of the stored article A and of the moisture absorption indicator pattern 30 printed as "KP" on the inner surface of the second packaging material 20.

The moisture absorption indicator pattern 30 is provided as printed characters of "KP" in FIG. 1(b), but may be provided as a printed pattern of numerals, designs, or a mixture thereof appropriately combined. As the desiccant contained in the desiccant-containing resin film 11 absorbs moisture to approach saturation in moisture absorption, the transparency of the desiccant-containing resin film 11 gradually increases, so that the moisture absorption indicator pattern 30 can obviously be recognized directly by unsealing the packaging bag, and can also be visually recognized from the outside of the packaging bag without unsealing. The moisture absorption indicator pattern 30 indicates the limit of preservation of the stored article A, and may be a written expression "reaching the preservation limit", or a combination of such an expression with designs, or a combination of characters, numerals, etc., having different print densities that can be visually recognized in the order of a degree of density according to a change in the transparency of the desiccant-containing resin film 11; that is, an extent of moisture absorption by the desiccant, to allow a check on the preservation limit step by step. This enables effective moisture-proof management for the stored article A.

According to this embodiment, when a pinhole is present on the light-reflective or light-absorbing film 24 or on the transparent barrier film 12, external moisture infiltrates into the packaging bag through the pinhole to cause the moisture absorption capability of the desiccant of the desiccant-containing resin film 11 to reach saturation in a relatively short time, thus causing the desiccant-containing resin film 11 to become partially or wholly transparent to allow visual recognition of the moisture absorption indicator pattern 30. This phenomenon enables a user to make a determination that the packaging bag does not function as a moisture-proof bag.

The embodiment of FIG. 2(b) will now be described. The same components as described in the above embodiment will be denoted by the same reference numerals as those denoting such components in the above embodiment. According to this embodiment, both first and second packaging materials 10 and 20 are provided with the desiccant-containing resin film in such a way that the desiccant-containing resin film 11 is formed on the bag interior side of the first packaging material 10, and that another desiccant-containing resin film 21 is formed on the bag interior side of the second packaging material 20. On the outside of the desiccant-containing resin film 21 of the second packaging material 20, the pattern printed film 23 having the moisture absorption indicator pattern 30 printed thereon and the light-reflective or light-absorbing film 24 are laminated in this order. The desiccant-containing resin film 21 of the second packaging material 20 is the same as the desiccant-containing resin film 11 according to the embodiment of FIG. 2(a).

According to this embodiment, the first packaging material 10 and the second packaging material 20 are provided with the desiccant-containing resin film 11 and the desiccant-containing resin film 21, respectively, so that the moisture absorption indicator pattern 30 cannot be visually recognized until the moisture absorption capability of desiccants contained in the desiccant-containing resin films 11 and 21 reach saturation. To ensure the fine visibility of the moisture absorption indicator pattern 30, an optical density difference with regard to the moisture absorption indicator pattern 30 must be enlarged. For this reason, the pattern printed film 23 should desirably be laminated on the outside thereof with the light-reflective film 24, which is made of an aluminum foil laminated film, etc., that has high reflectivity. Since the first packaging material 10 and the second packaging material 20 are provided with the respective desiccant-containing resin films 11 and 21, the whole of the inner side of the packaging bag is covered with the desiccant-containing resin films. As a result, the packaging bag can maintain its function as the moisture-proof bag for a longer time than in the case of the embodiment of FIG. 2(a), except that it partially depends on the capability of the transparent barrier film 12.

The embodiment of FIG. 2(c) will now be described. The same components as described in the above embodiment will be denoted by the same reference numerals as those denoting such components in the above embodiment. According to this embodiment, the first packaging material 10 is a laminate formed of the transparent barrier film 12 and the desiccant-containing resin film 11. The second packaging material 20 includes the thermoplastic resin film 22 provided on the bag interior side of the second packaging material 20, and also includes the pattern printed film 23 having the moisture absorption indicator pattern 30 printed thereon, the light-reflective or light-absorbing film 24, and the transparent barrier film 25 that are laminated in this order on the outside of the thermoplastic resin film 22. According to this embodiment, the outermost side of the packaging bag is laminated with the transparent barrier films 12 and 25, which provides the packaging bag that is capable of maintaining the moisture absorption capability of the desiccant-containing resin film 11 for a long time.

The barrier film 25 of the second packaging material 20 of this embodiment should preferably be a gas barrier film, and does not necessarily have to be transparent. For example, the barrier film 25 is made of an aluminum laminate film, a metal evaporated film such as aluminum-evaporated film, inorganic-evaporated film, or inorganic oxide-evaporated film, a K-coated film (film coated with vinylidene chloride-vinyl chloride copolymer latex), an OPP film (biaxially oriented polypropylene film), or an OPE film (oriented polyethylene film). The barrier film 25 may also be made of a coextruded film, an engineering plastic film such as polyimide, polycarbonate, PPS (polyphenylene sulfide), or PES (polyether sulfide), or a fluorocarbon resin film such as PTFE (polytetrafluoroethylene). Covering both surfaces of the first and second packaging films 10 and 20 with the barrier films enables control of the saturation reaching time of the moisture absorption capability of the desiccant-containing resin films 11 and 21, for example, in a range of 1 day to 100 days or longer. When the barrier capability of the first packaging material 10 and of the second packaging material 20 is determined to be substantially equal, and the moisture-proof capability of the transparent barrier films 12 and 25 is selected according to required moisture absorption capability, the packaging bag capable of semipermanently maintaining moisture-proof capability can be provided.

The transparent barrier film 12 of the first packaging material 10 in this embodiment is the same as the transparent barrier film 12 described in the above embodiment. The transparent barrier film 12 of the first packaging material 10 cannot be made of such a light-reflective film as aluminum laminate film because of a demand for transparency, but can be made of a film that is provided with a silica- or alumina-evaporated film, a multilayer-evaporated film of silica and alumina, a silicon nitride-evaporated film, a coating layer of a barrier paint, or a layer made by coating an evaporated film with a barrier paint. The transparent barrier film 12 has moisture barrier characteristics in terms of water vapor transmission rate of 0.001 to 100 g/m$^2$/day.

The embodiment of FIG. 2(d) will now be described. The same components as described in the above embodiment will be denoted by the same reference numerals. According to this embodiment, the first packaging material 10 and the second packaging material 20 are provided with the transparent barrier film 12 and the transparent barrier film 25, respectively, and also with the desiccant-containing resin film 11 and the desiccant-containing resin film 21, respectively. The desiccant-containing resin films 11 and 21 in this embodiment are the same as the desiccant-containing resin film described in the above embodiment, and are each coated with a polyolefin resin on both surfaces thereof. On the outside of the desiccant-containing resin film 21 of the second packaging material 20, the pattern printed film 23 having the moisture absorption indicator pattern 30 printed thereon, the light-reflective or light-absorbing film 24, and the transparent barrier film 25 are laminated in this order.

According to this embodiment, the outermost surfaces of the first packaging material 10 and the second packaging material 20 of the packaging bag are laminated with the transparent barrier film 12 and the transparent barrier film 25, respectively. Because of this, the desiccant-containing resin films 11 and 21 can maintain their moisture absorption capability for a longer time than in the case of the embodiment of FIG. 2(b). The first packaging material 10 and the second packaging material 20 have the desiccant-containing resin films 11 and 21, respectively, which slightly deteriorates the visibility of the moisture absorption indicator pattern 30. For this reason, the light-reflective film 24 made of an aluminum foil laminated film, etc., should preferably be overlaid on the outside surface of the pattern printed film 23 to enlarge an optical density difference. Coating the surfaces of the desiccant-containing resin films 11 and 21 with the polyolefin resin improves the visibility.

Figure 2A:
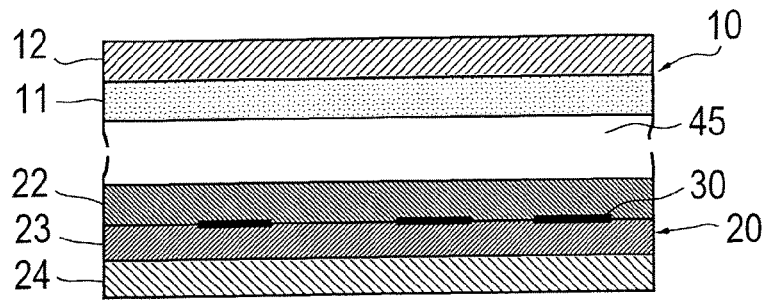
FIGS. 2(a) to 2(d) are schematic sectional views of respective forms of a first packaging material and a second packaging material according to the embodiment of FIGS. 1(a) and 1(b).
Figure 3A:
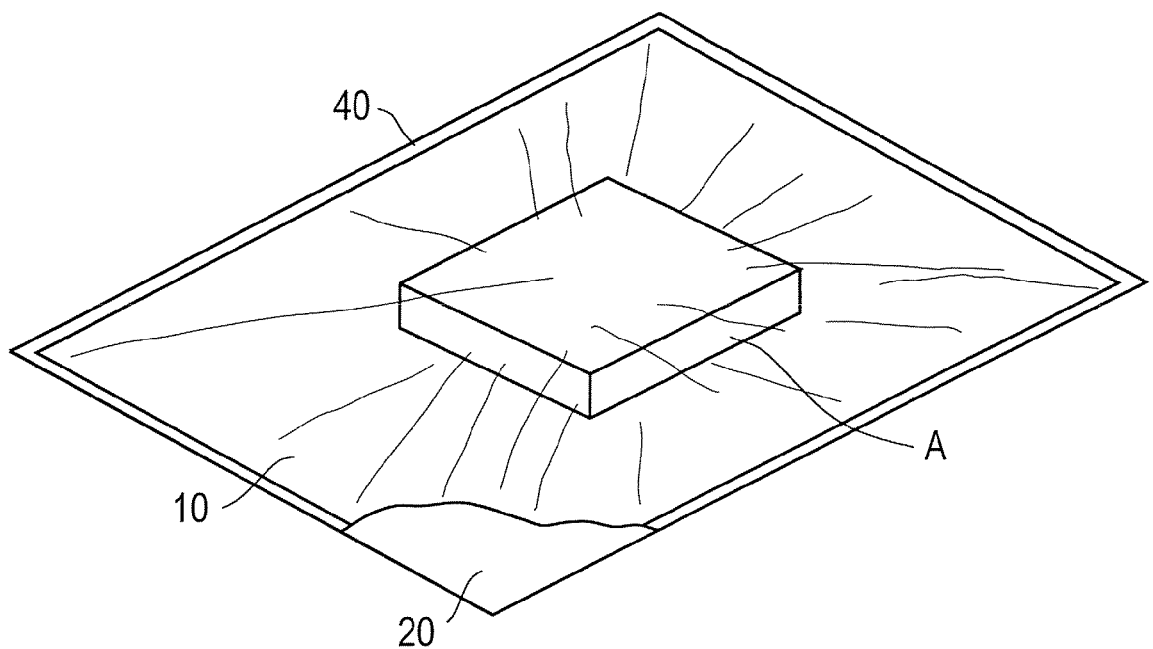
FIG. 3(a) is a partially cutout perspective view of another embodiment of the packaging bag with a moisture absorption indicator function according to the present invention.
Figure 3B:
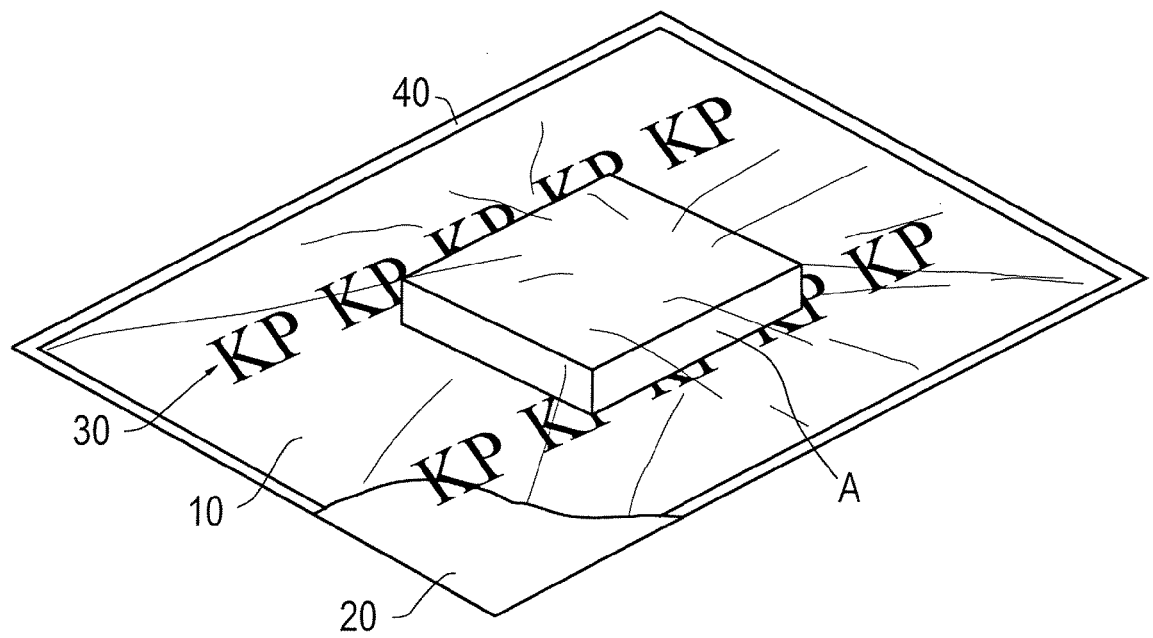
FIG. 3(b) is a partially cutout perspective view of the packaging bag on which the moisture absorption indicator pattern has appeared when the moisture absorptiveness of the desiccant of the desiccant-containing resin film has reached saturation.
Figure 4A:
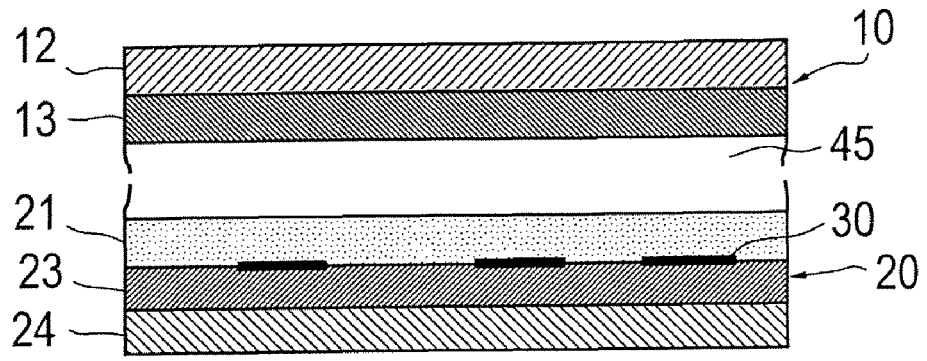
FIGS. 4(a) and 4(b) are schematic sectional views of respective forms of the first packaging material and the second packaging material according to the embodiment of FIGS. 3(a) and 3(b).
Figure 4B:
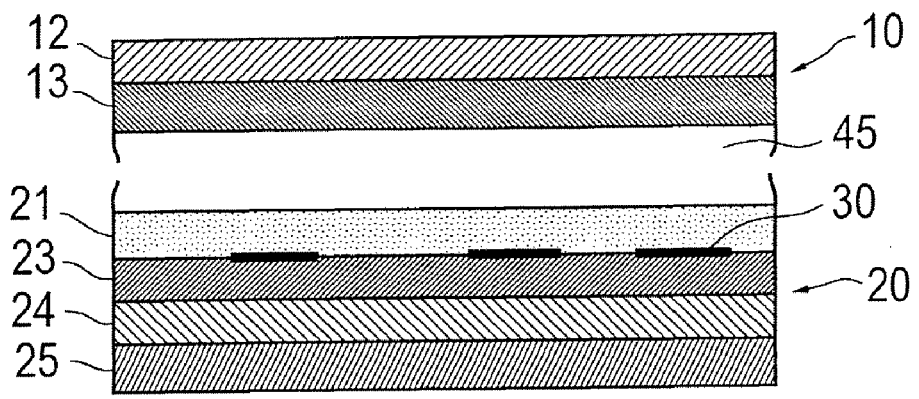

Another embodiment of the packaging bag with a moisture absorption indicator function according to the present invention shown in FIGS. 3(a) and 3(b) will now be described. FIGS. 3(a) and 3(b) are partially cutout perspective views of the packaging bag of this embodiment. The peripheral four sides of the first and second packaging materials 10 and 20 are sealed together with the heat seal portion 40, and the article A is stored in the packaging bag interior 45. Examples of this embodiment are depicted in FIGS. 4(a) and 4(b). This embodiment is different from the embodiment of FIGS. 2(a) to 2(d) in the point that the first packaging material 10 is a transparent laminated film, and that the desiccant-containing resin film 21 is included in the second packaging material 20. As shown in FIG. 3(a), the stored article A can be recognized from the outside of the packaging bag. FIG. 3(a) depicts a state of maintenance of the moisture absorption capability of the desiccant-containing resin film 21, in which state the moisture absorption indicator pattern 30 on the bag interior side of the second packaging material 20 cannot be recognized. In a state shown in FIG. 3(b), on the other hand, the moisture absorption indicator pattern 30 can be recognized. FIG. 3(b), therefore, depicts the complete saturation of moisture absorption capability of the desiccant-containing resin film 21.

Embodiments of FIGS. 4(a) and 4(b) will now be described. The same components as described in the above embodiment will be denoted by the same reference numerals. According to the embodiment of FIG. 4(a), the first packaging material 10 is a laminated film formed of the transparent barrier film 12 that is the outermost layer of the packaging bag, and a thermoplastic resin film (sealant film) 13. The second packaging film 20 includes the desiccant-containing resin film 21, the pattern printed film 23 printed with the moisture absorption indicator pattern 30, the pattern printed film 23 being overlaid on the outside of the desiccant-containing resin film 21, and the light-reflective or light-absorbing layer 24 that is overlaid on the pattern printed film 23. The thermoplastic resin film 13 is the same as the thermoplastic resin film 22 in the embodiment of FIG. 2(*a*) or 2(*c*), and is selected as a material having a fine sealing property.

According to the embodiment of FIG. 4(*b*), the first packaging material 10 is the laminated film formed of the transparent barrier film 12 that is the outermost layer, and the thermoplastic resin film (sealant film) 13. The second packaging material 20 includes the desiccant-containing resin film 21, the pattern printed film 23 printed with the moisture absorption indicator pattern 30, the light-reflective or light-absorbing layer 24, and the transparent barrier film 25, the pattern printed film 23, light-reflective or light-absorbing layer 24, and transparent barrier film 25 being laminated in this order on the outside of the desiccant-containing resin film 21. According to this embodiment, the outermost layer of the packaging bag is covered with the barrier films 12 and 25. The barrier film 12 of the first packaging material 10 is transparent, but the barrier film 25 of the second packaging material 20 does not necessarily have to be transparent. The barrier film 25 is acceptable when having a fine barrier property against water vapor.

In each of the embodiments of FIGS. 4(*a*) and 4(*b*), the second packaging material 20 is provided with the desiccant-containing resin film 21, which has a whitish turbid appearance. When the desiccant of the desiccant-containing resin film 21 absorbs moisture to reach saturation, however, the desiccant-containing resin film 21 changes its appearance from white into transparent. As a result, the moisture absorption indicator pattern 30 of the pattern printed film 23 can be visually recognized through the desiccant-containing resin film 21 of the second packaging material 20, which desiccant-containing resin film 21 has turned transparent.

In each of the embodiments of FIGS. 4(*a*) and 4(*b*), in the same manner as in the above embodiment, the desiccant-containing resin film 21 is made of a resin composition containing zeolite, and is laminated with polyolefin (e.g., LLDPE) on one or both surfaces of the desiccant-containing resin film 21 by the coextrusion method.

In a case where the transparent barrier film 25 of the second packaging material 20 is made of a polyester film, laminating the second packaging material 20 with the transparent barrier film 25 enables control of moisture absorption from one or both surfaces because the transparent barrier film 25 has a barrier property against moisture permeation. The transparent barrier film 12 of the first packaging material 10 should preferably be a gas barrier transparent film such as an inorganic-evaporated film, an inorganic oxide-evaporated film, a K-coated film (film coated with vinylidene chloride-vinyl chloride copolymer latex), an OPP film (biaxially oriented polypropylene film), or an OPE film (oriented polyethylene film). The transparent barrier film 12 may also be made of a coextruded film, an engineering plastic film such as polyimide, polycarbonate, PPS (polyphenylene sulfide), or PES (polyether sulfide), or a fluorocarbon resin film such as PTFE (polytetrafluoroethylene). The transparent barrier film 12 is a film that is provided with a silica- or alumina-evaporated film, a multilayer-evaporated film of silica and alumina, a silicon nitride-evaporated film, a coating layer of a barrier paint, or a layer made by coating an evaporated film with a barrier paint. The transparent barrier film 12 has moisture barrier characteristics in terms of water vapor transmission rate of 0.001 to 100 g/m$^2$/day. Covering both outer surfaces of the first and second packaging materials 10 and 20 with the barrier films enables control of the saturation reaching time of moisture absorptiveness of the desiccant-containing resin film 21 according to moisture absorption capability demanded by the stored article A in a range of, for example, 1 day to 100 days or longer.

The packaging bag of the present invention is the packaging bag that is formed by heat sealing the peripheral four sides of the first and second packaging materials to provide one storage portion, as described in the above embodiments. The packaging bag may be so formed as to, for example, give the second packaging material a box-like or cylindrical shape, or as to provide two storage portions, which latter case enables packaging of a pair of products consisting of a product requiring moisture absorption capability and a product not requiring moisture absorption capability. A heavy metal harmful to the human body is not used for surface treatment on the transparent barrier film, and as the material of the desiccant, either.

According to the present invention, the transparent barrier film may be coated with a globular light-scattering material such as glass beads, silica, or acryl beads or the desiccant-containing resin film may be mixed or coated with a light-scattering material to improve the visibility of the indicator pattern.

Embodiments of a drying agent with a moisture absorption indicator function according to the present invention will now be described with reference to the drawings.

Figure 5:
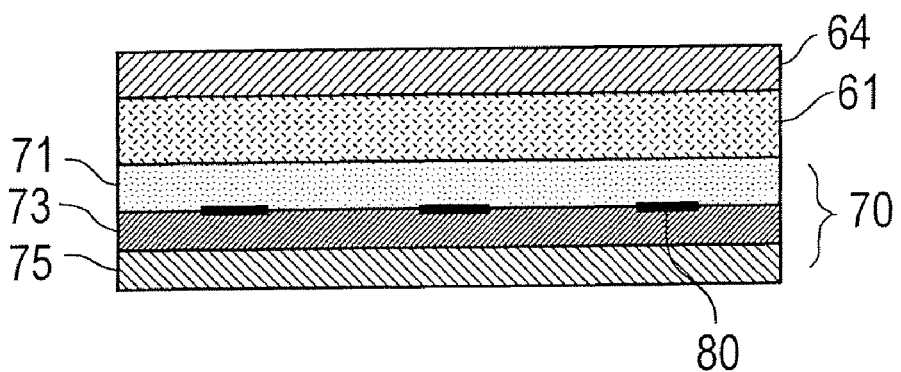
FIG. 5 is a sectional view of one embodiment of a drying agent with a moisture absorption indicator function according to the present invention.

One embodiment of the drying agent with a moisture absorption indicator function according to the present invention will be described first with reference to FIG. 5. As shown in FIG. 5, the drying agent of the present invention includes an indicator film layer 70, a transparent desiccant film (main desiccant layer) 61 functioning as a main desiccant, which transparent desiccant film 61 is overlaid on the indicator film layer 70, and a moisture permeable film 64 that is overlaid on the transparent desiccant film 61. The indicator film layer 70 has a barrier film 75, a pattern printed layer 73 for a moisture absorption indicator, and a moisture-absorbing film 71 containing zeolite, the pattern printed layer 73 and moisture-absorbing film 71 being laminated on the barrier film 75 in this order. The transparent desiccant film 61 is overlaid on the moisture-absorbing film 71 of the indicator film layer 70.

The barrier film 75 is a film that cuts off moisture infiltrating from the pattern printed layer 73 into the moisture-absorbing film 71, and is made of a polyester film, for example, made of a polyethylene terephthalate (PET) film. The barrier film 75 should preferably be made of a film having a barrier property against water vapor or gas, such as a silica- or alumina-evaporated film, a film sputtered with a nitride, a laminate of an aluminum foil and a thermoplastic film, a K-coated film (film coated with vinylidene chloride-vinyl chloride copolymer latex), an OPP film (biaxially oriented polypropylene film), or an OPE film (oriented polyethylene film). The barrier film 75 may also be made of a coextruded film, an engineering plastic film such as polyimide, polycarbonate, PPS (polyphenylene sulfide), or PES (polyether sulfide), or a fluorocarbon resin film such as PTFE (polytetrafluoroethylene). The barrier film 75 should desirably have moisture barrier characteristics in terms of water vapor transmission rate of 0.001 to 100 g/m$^2$/day.

The pattern printed layer 73 is made by printing a moisture absorption indicator pattern 80 on a thermoplastic resin film. The moisture absorption indicator pattern 80 may be printed on the back face of the moisture-absorbing film 71 or on the upper surface of the barrier film 75. The moisture absorption indicator pattern 80 of the pattern printed layer 73 is a printed pattern including characters, numerals, designs, or a mixture thereof appropriately combined. The surface of pattern printed layer 73 that bears the moisture absorption indicator pattern 80 may be painted with ink having a color of any one or a mixture of white, black, red, blue, green, yellow, indigo, cyan, and magenta, which color functions as a background color for the moisture absorption indicator pattern 80. This background color provides a clear optical density difference at the time of visual recognition of the moisture absorption indicator pattern 80, and the tint of the background color is determined in view of the tint of the moisture absorption indicator pattern 80. The ink used for printing the moisture absorption indicator pattern 80 contains a pigment or dye at a weight ratio to the resin of 0.01 to 200% by weight, and has a film thickness of 0.3 to 100 μm.

The moisture-absorbing film 71 is made of a resin composition containing a desiccant, for example, zeolite mixed therein, which resin composition is laminated with polyolefin (e.g. LLDPE) on one or both surfaces thereof by the coextrusion process when the moisture-absorbing film 71 containing the zeolite is molded. Zeolite is a powdered inorganic porous substance having a pore diameter of 3 to 10 Å, and is used as a preferable absorbent. A zeolite having an average particle diameter of, for example, about 10 μm is preferable. The zeolite is a porous particulate substance with polarity that is used to separate substances depending on a size of a molecule, and has a structure with uniform pores, so that the zeolite absorbs small molecules entering the cavities of the fine pores to act as a kind of a sieve. In addition to the zeolite, the desiccant contained in the moisture-absorbing film 71 may also contain at least one or more of substances selected from calcium oxide, silica gel, calcium chloride, sulfate compound, barium oxide, alumina, activated carbon, and clay compound, but should preferable be made of a synthetic or natural zeolite.

The moisture-absorbing film 71 is manufactured in the following way. First, a base resin is mixed with 5 to 80% of zeolite by weight, and formed into a film shape after adding an additive, such as an ethylene-acrylic ester-maleic anhydride copolymer, or the like at a mixture ratio of 1 to 20% by weight to enhance an affinity of the base resin and zeolite. In forming the zeolite-containing resin film, one or both surfaces of the zeolite-containing resin are laminated with polyolefin (e.g., LLDPE) by the coextrusion process. The mixture ratio of the zeolite should preferably be 40 to 80%, and further preferably be 50 to 80% in terms of weight ratio. This gives the moisture-absorbing film high absorption capability, and enhances the effectiveness of concealment of the moisture absorption indicator pattern before moisture absorption.

The base resin is provided as a thermoplastic resin, which is made of one or more resins selected from, for example, LDPE (low density polyethylene), LLDPE (linear low density polyethylene), PP (polypropylene), and various copolymers such as ionomer, EAA, EMAA, EVA, EEA, EMA, EMMA, etc. and which is used alone or in a mixture form. The selection from such resins is made so as to include a resin having a high MFR (melt flow rate), preferably having an MFR of 10 (g/10 minutes) or higher as measured under the conditions of a temperature of 190° C. and a load of 21.18 N.

The transparent desiccant film 61, which is the main desiccant layer, is a film made by mixing silicon dioxide (silica gel), which is a main desiccant, into a thermoplastic resin. The silicon dioxide (silica gel) is the most preferable substance as the main desiccant, but the main desiccant may also be made of fine powder of calcium oxide, calcium chloride, sulfate compound, barium oxide, etc.

In providing a modification of this embodiment, the transparent desiccant film 61, which is the main desiccant layer, may be replaced with a transparent desiccant molded body. This transparent desiccant molded body is made by typically mixing silicon dioxide (silica gel) into a thermoplastic resin, and is molded using a molding die. The transparent desiccant molded body includes a molded body of a sheet shape, plate shape, stick shape, and even of a castable shape. A stick-shaped transparent desiccant molded body has, for example, a rectangular section. The moisture permeable film 64 is overlaid on one surface of the stick-shaped transparent desiccant molded body, and the moisture-absorbing film 71 of the indicator film layer 70 is overlaid on the other surface of the same to be opposite to the moisture permeable film 64.

According to the above embodiment, the moisture absorption indicator pattern 80 of the pattern printed layer 73 becomes visually recognizable from the outside of the drying agent as the moisture absorption capability of the transparent desiccant film 61 or the transparent desiccant molded body approaches saturation. Being able to see the moisture absorption indicator pattern 80 from the outside, therefore, means that the absorption capability of the drying agent has reached saturation.

Figure 6:
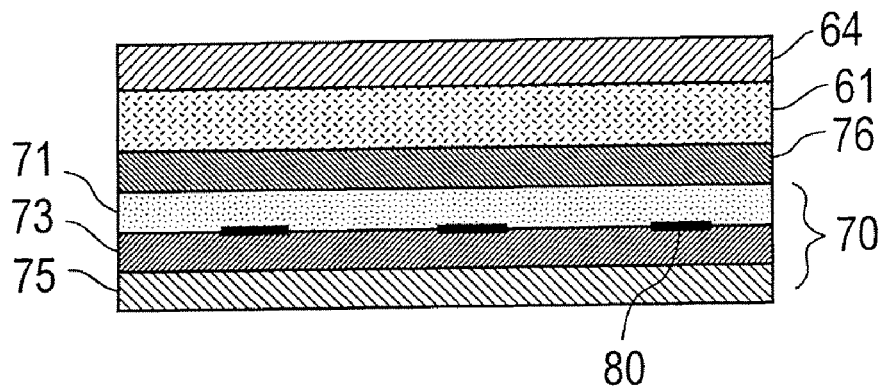
FIG. 6 is a sectional view of another embodiment of the drying agent with a moisture absorption indicator function according to the present invention.

Another embodiment of the drying agent with a moisture-absorbing indicator function according to the present invention will now be described with reference to FIG. 6. As shown in FIG. 6, according to this embodiment, a moisture permeability control film 76 is interposed between the transparent desiccant film 61 or the transparent desiccant molded body, which is the main desiccant layer of the above embodiment, and the moisture-absorbing film 71. The moisture permeability control film 76 is a transparent film, and is made of, for example, polyethylene terephthalate (PET), which is a thermoplastic resin. The moisture permeability control film 76 may be made of another kind of a thermoplastic resin, such as polyethylene (PE), polypropylene (PP), polyvinyl chloride (PVC), nylon (Ny), ethylene vinyl acetate (EVA), polystyrene (PS), ethylene-vinyl alcohol copolymer (EVOH), or polyvinylidene chloride (PVDC). Also, the moisture permeability control film 76 may be made of cellophane that has superior moisture absorptiveness and moisture permeability.

The moisture permeability control film 76 made of the above thermoplastic resin or cellophane functions as a protective film that prevents the moisture absorption capability of the moisture-absorbing film 71 from saturating faster than the moisture absorption capability of the main desiccant while the moisture absorption capability of the transparent desiccant film 61 or the transparent desiccant molded body, which is the main desiccant layer, continues working. The transparent desiccant film 61 or the transparent desiccant molded body maintains the moisture absorption capability longer than the moisture-absorbing film 71 does, so that covering the moisture-absorbing film 71 with the moisture permeability control film 76 enables control of a moisture absorption capability maintenance time of the moisture-absorbing film 71. Control of the maintenance time is carried out by properly selecting the film thickness of the thermoplastic resin or cellophane and the inherent moisture absorption rate of such a material to determine the moisture permeability control film 76 to be used. The moisture permeability control film 76 can be selected as a film having a water vapor transmission rate of 0.01 to 5000 g/m$^2$/day. The use of the moisture permeability control film 76 offers an advantage of allowing the drying agent with the moisture absorption indicator function to determine moisture absorption capability required as the drying agent in a desirable manner.

Figure 7A:
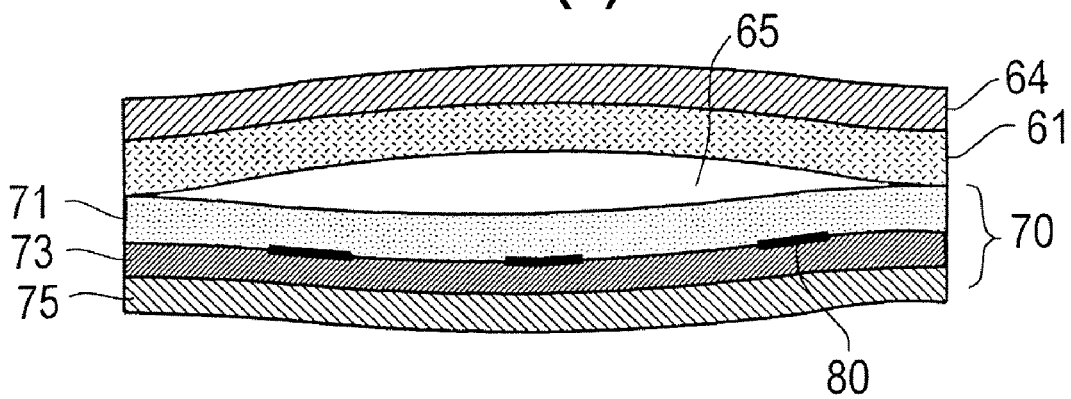
FIGS. 7(a) and 7(b) are respective sectional views of further embodiments of the drying agent with a moisture absorption indicator function according to the present invention, which drying agent has a bag-like portion.
Figure 7B:
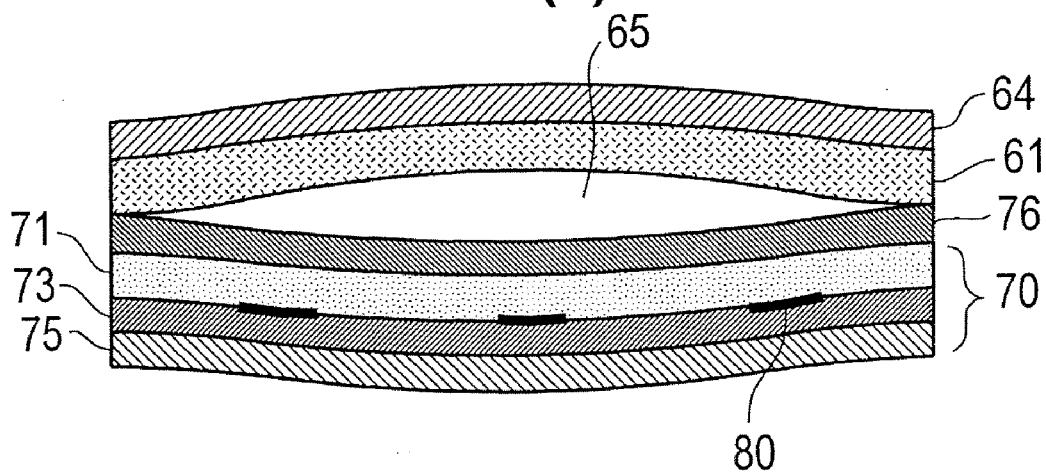

FIGS. 7(a) and 7(b) depict further embodiments of the drying agent with a moisture absorption indicator function according to the present invention. According to the embodiment of FIG. 7(a), a bag-like portion 65 is provided by forming a space between laminated layers. A sheet bearing an indication of a desiccant can be put in the bag-like portion 65. According to the embodiment of FIG. 5, the indicator film layer 70 is the laminate formed of the moisture-absorbing film 71, pattern printed layer 73, and barrier film 75, and the transparent desiccant film 61 and the moisture permeable film 64 are laminated in this order on the moisture-absorbing film 71 of the indicator film layer 70. In contrast, according to the embodiment of FIG. 7(a), the bag-like portion 65 is formed between the moisture-absorbing film 71 and the transparent desiccant film 61. According to this embodiment, a sheet of the indicator film layer 70 and a sheet of lamination of the transparent desiccant film 61 and the moisture permeable film 64 are so heat sealed together at the peripheries of both sheets that the moisture-absorbing film 71 and the transparent desiccant film 61 face each other.

The embodiment of FIG. 7(b) corresponds to the embodiment of FIG. 6, and provides the bag-like portion 65 formed between the transparent desiccant film 61 and the moisture permeability control film 76. According to the embodiment of FIG. 7(b), a sheet of lamination of the moisture permeable film 64 and the transparent desiccant film 61 and a sheet of lamination of the indicator film 70 and the moisture permeability control film 76 are so heat sealed together at the peripheries of both sheets that the transparent desiccant film 61 and the moisture permeability control film 76 face each other. With respect to the embodiments of FIGS. 7(a) and 7(b), the sheet of lamination of the moisture permeable film 64 and the transparent desiccant film 61, and the sheet of the indicator film layer 70 or the sheet of lamination of the indicator film layer 70 and the moisture permeability control film 76 are depicted as exaggerated curved shapes to give a clear picture of the bag-like portion 65, but the drying agent as a whole actually has the sheet-like outline.

Figure 8A:
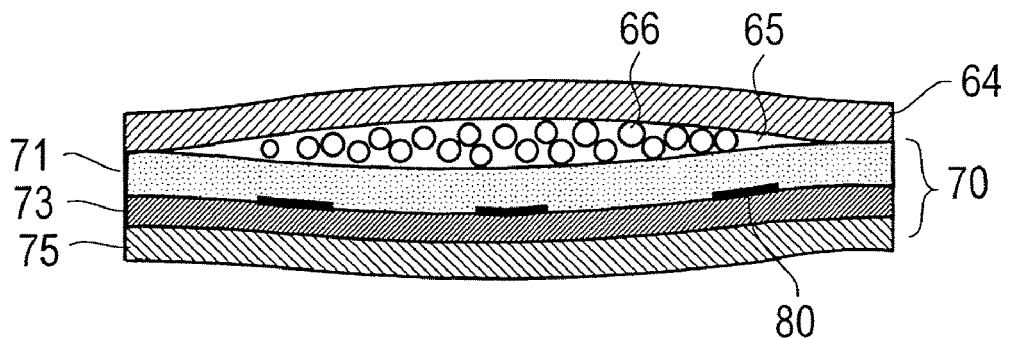
FIGS. 8(a) and 8(b) are respective sectional views of still further embodiments of the drying agent wherein a desiccant is stored in the bag-like portion.
Figure 8B:
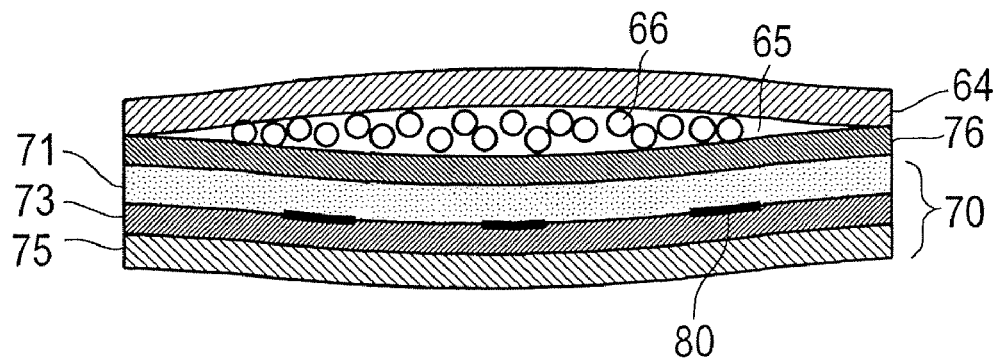
Figure 9:
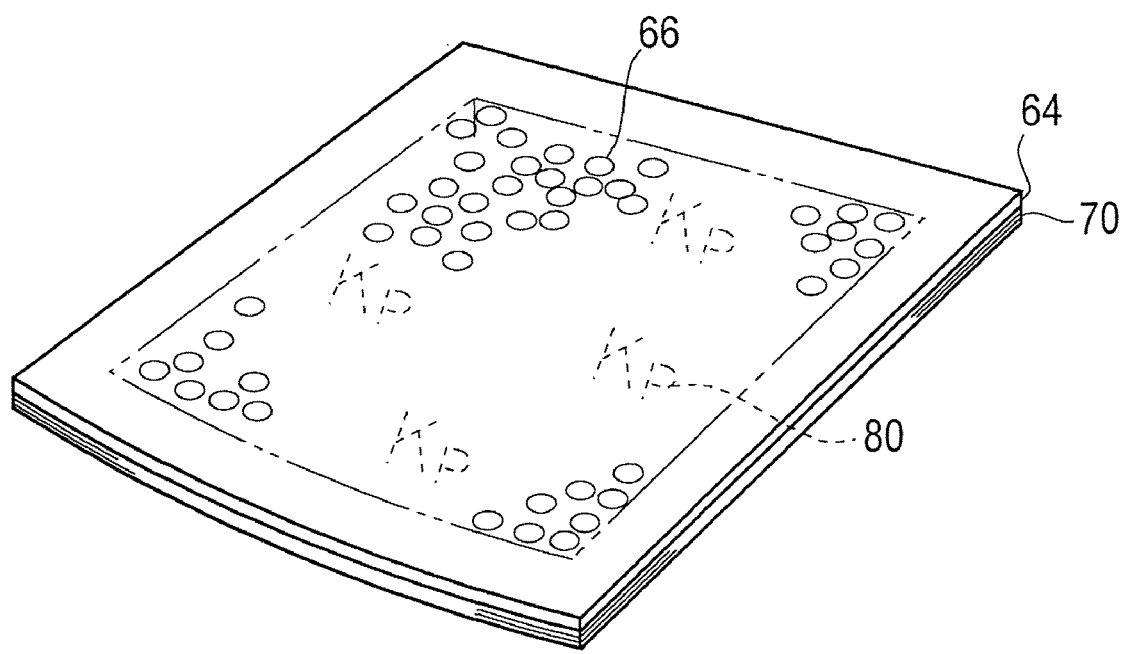
FIG. 9 is a perspective view of the embodiment of FIG. 8(b).
Figure 10:
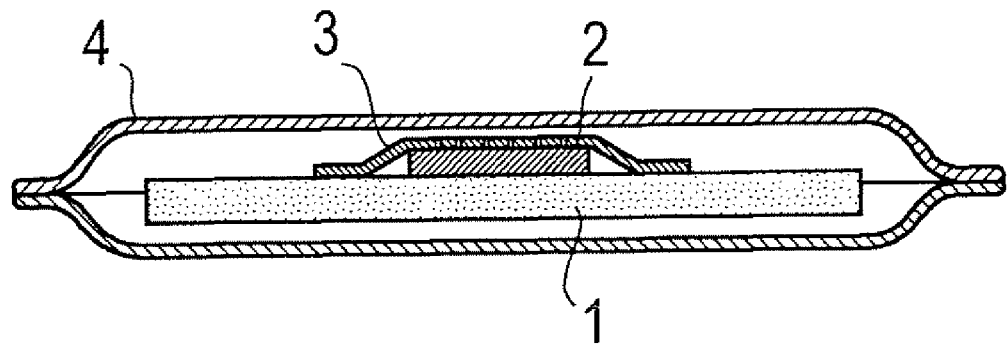
FIG. 10 is a schematic sectional view of a conventional drying agent with a moisture absorption indicator function.
Figure 11:
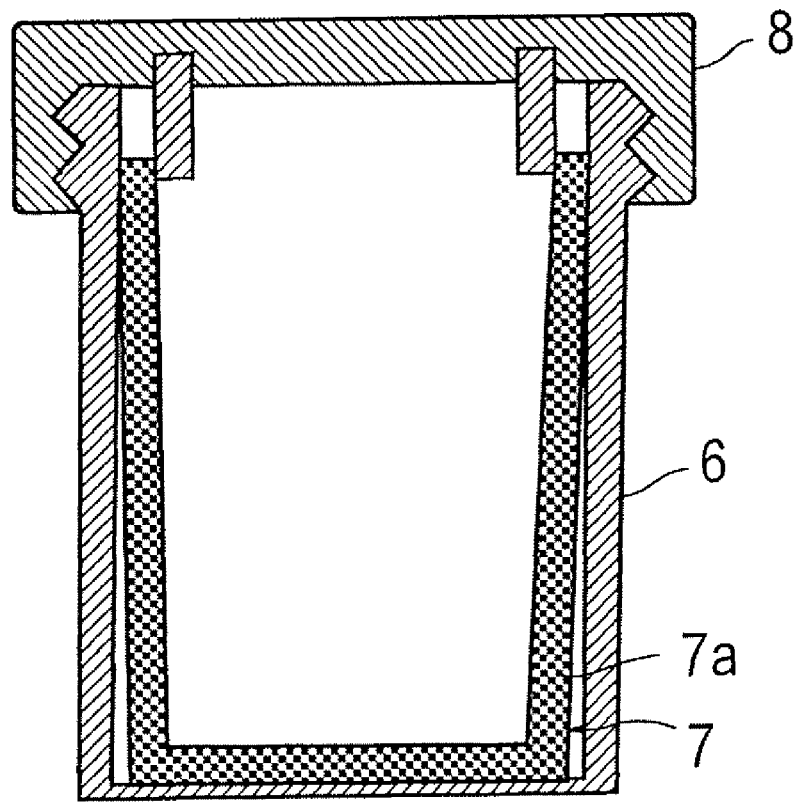
FIG. 11 is a schematic sectional view of a conventional package having a moisture absorption indicator function.

Still further embodiments of the drying agent according to the present invention are shown in FIGS. 8(a), 8(b), and 9, which include the bag-like portion 65 filled with molded globular transparent silica gel 66. According to the embodiment of FIG. 8(a), the bag-like portion 65 is formed using the moisture-absorbing film 71 of the indicator film layer 70 and the moisture permeable film 64, and is filled with the silica gel 66. According to the embodiment of FIG. 8(b), the bag-like portion 65 is formed using a sheet of lamination of the indicator film layer 70 and the permeability control film 76 on the moisture-absorbing film 71 of the indicator film layer 70, and the moisture permeable film 64, and is filled with the silica gel 66. The silica gel 66 is transparent, thus not facilitating a determination on whether the function of the silica gel 66 as the desiccant has been lost even when moisture absorption by the silica gel 66 reaches saturation. The silica gel 66 may be formed into a columnar shape or tabular shape. The pattern printed layer 73 is printed with the moisture absorption indicator pattern 80, which is, for example, a printed pattern of "Kp". The moisture absorption indicator pattern 80 cannot be visually recognized from the outside while the moisture absorption capability is maintained, but the printed pattern of "Kp" as the absorption indicator pattern 80 can be visually recognized when the moisture absorptiveness of the moisture-absorbing film 71 reaches saturation, which indicates the loss of the function as the drying agent. The moisture absorption indicator pattern 80 of the pattern printed layer 73 of this embodiment is the same as the moisture absorption indicator pattern 80 described in the above embodiment. The desiccant stored in the bag-like portion 65 does not have to be transparent, but instead can be nontransparent if the desiccant becomes transparent at the point that the moisture absorptiveness of the desiccant reaches saturation or if a part of the pattern printed layer 73 including the moisture absorption indicator pattern 80 at the back of the desiccant can be visually recognized at the point that the desiccant is stored in the bag-like portion 65.

The moisture absorption indicator pattern 80 is provided as printed characters "Kp", etc., in FIG. 9, but may be provided as a printed pattern of numerals, designs, or a mixture thereof appropriately combined. As the desiccant contained in the moisture-absorbing film 71 absorbs moisture to approach saturation in moisture absorption, the transparency of the moisture-absorbing film 71 increases, which allows visual recognition of the moisture absorption indicator pattern 80. The moisture absorption indicator pattern 80 may be a written expression "reaching the preservation limit", or a combination of such an expression with designs, or a combination of characters, numerals, etc., having different print densities that can be visually recognized in the order of a degree of density to allow visual recognition of a state of moisture absorption step by step.

While the bag-like portion 65 is filled with the silica gel 66 functioning as the desiccant according to the embodiments of FIGS. 8(a) and 8(b), a deliquescent desiccant may also be used in place of the silica gel 66. The deliquescent desiccant is provided as calcium chloride, magnesium chloride, potassium oxide, sodium oxide, alunite, magnesium sulfate, phosphorus oxide, etc. The deliquescent desiccant absorbs moisture to become a transparent liquefied matter, through which the moisture absorption indicator pattern 80 can be visually recognized. These desiccants are acceptable if the desiccants turn transparent when their moisture absorption capability reaches saturation.

Example

Examples of the packaging bag according to the present invention will be described. Materials used for the following examples will be described first. A $PETsio_x$ film, which is made by vapor depositing silica on a PET film, is used for a transparent barrier film. The $PETsio_x$ film is 12 μm in thickness, and is laminated with an LDPE (low density polyethylene) film of 40 μm in thickness to provide the transparent barrier film. The transparent barrier film has a water vapor transmission rate of 0.1 $g/m^2/day$, and corresponds to the transparent barrier film 12 of the first packaging material 10 of the embodiments of FIGS. 2(a) to 2(d), and 4(a) and 4(b).

A laminate of a transparent barrier film and a desiccant-containing resin film is the laminate that is formed of a transparent barrier film made of a $PETsio_x$ film of 12 μm in thickness, and a film made by laminating both surfaces of a desiccant-containing resin layer of 60 μm in thickness with an LDPE film of 10 μm in thickness. The desiccant-containing resin layer contains LDPE and zeolite at a weight ratio of 1:1. The laminate of the transparent barrier film and the desiccant-containing resin film has a water vapor transmission rate of 0.2 $g/m^2/day$, and corresponds to the first packaging material 10 of the embodiments of FIGS. 2(a) to 2(d).

An aluminum-evaporated film ($PET_{AL}$) is made by vapor depositing aluminum on a PET film to have a thickness of 50 μm. The aluminum-evaporated film ($PET_{AL}$) has a water vapor transmission rate of 1.0 g/m²/day, and corresponds to the light-reflective film 24 of the embodiments of FIGS. 2(a) to 2(d), and 4(a) and 4(b).

A laminate of a light-absorbing film and a transparent barrier film is the laminate that is formed of a light-absorbing film made by printing a PET film of 100 μm in thickness with black ink, and the above transparent barrier film. The laminate of the light-absorbing film and the transparent barrier film has a water vapor transmission rate of 0.05 g/m²/day, and corresponds to the light-absorbing film 24 and the transparent barrier film 25 of the embodiments of FIGS. 2(C) and 2(d), and 4(b).

A laminate of an aluminum-evaporated film and a transparent barrier film is the laminate that is formed of the above aluminum-evaporated film ($PET_{AL}$), and the above transparent film. The laminate of the aluminum-evaporated film and the transparent barrier film has a water vapor transmission rate of 0.02 g/m²/day, and corresponds to the light-reflective film 24 and the transparent barrier film 25 of the embodiments of FIGS. 2(C) and 2(d), and 4(b).

An aluminum foil laminated film is made by laminating an aluminum foil of 9 μm in thickness with a PET film of 12 μm in thickness. The aluminum foil laminated film has a water vapor transmission rate of 0.00 g/m²/day, and corresponds to the light-reflective film 24 of the embodiments of FIGS. 2(a) and 2(b), and 4(a) and 4(b).

A pattern printed film is made by printing a moisture absorption indicator pattern on a PET film of 25 μm in thickness, and corresponds to the pattern printed film 23 of the embodiments of FIGS. 2(a) to 2(d), and 4(a) and 4(b).

A thermoplastic resin film is made of an LDPE film of 40 μm in thickness, has a water vapor transmission rate of 10 g/m²/day, and corresponds to the thermoplastic film 22 or the sealant film 13 of the embodiments of FIGS. 2(a) and 2(c), and 4(a) and 4(b).

In example 1, the first packaging material 10 is a laminate formed of the transparent barrier film and the sealant film, and the second packaging material 20 is a laminate formed of the desiccant-containing resin film, the pattern printed film, and the aluminum foil laminated film (FIG. 4(a)).

In example 2, the first packaging material 10 is the laminate formed of the transparent barrier film and the sealant film, and the second packaging material 20 is a laminate formed of the desiccant-containing resin film, the pattern printed film, and the aluminum-evaporated film (FIG. 4(a)).

In example 3, the first packaging material 10 is the laminate formed of the transparent barrier film and the sealant film, and the second packaging material 20 is a laminate formed of the desiccant-containing resin film, the pattern printed film, the aluminum-evaporated film, and the transparent barrier film (FIG. 4(b)).

In example 4, the first packaging material 10 is the laminate formed of the transparent barrier film and the sealant film, and the second packaging material 20 is a laminate formed of the desiccant-containing resin film, the pattern printed film, the light-absorbing film, and the transparent barrier film (FIG. 4(b)).

Figure 2B:
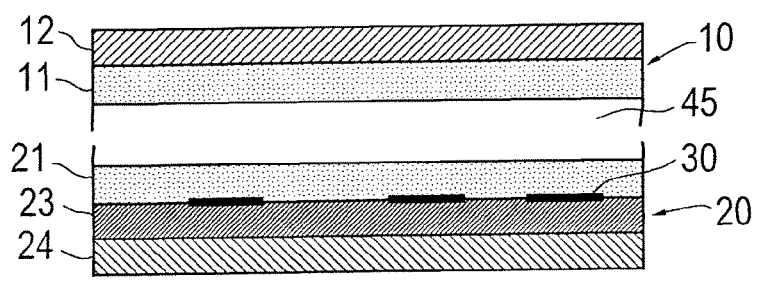

In example 5, the first packaging material 10 is a laminate formed of the transparent barrier film and the desiccant-containing resin film, and the second packaging material 20 is the laminate formed of the desiccant-containing resin film, the pattern printed film, the aluminum foil laminated film (FIG. 2(b)).

In example 6, the first packaging material 10 is the laminate formed of the transparent barrier film and the desiccant-containing resin film, and the second packaging material 20 is the laminate formed of the desiccant-containing resin film, the pattern printed film, and the aluminum-evaporated film (FIG. 2(b)).

Figure 2C:
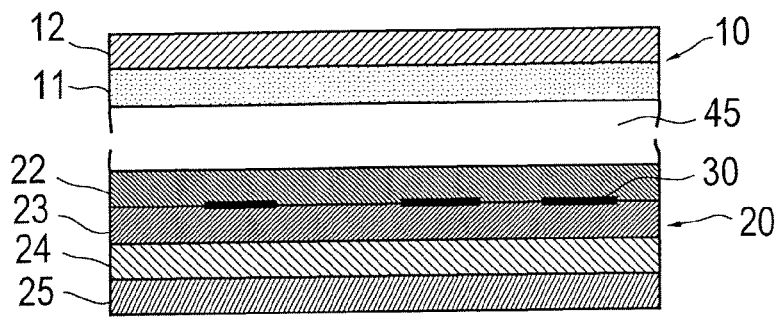
Figure 2D:
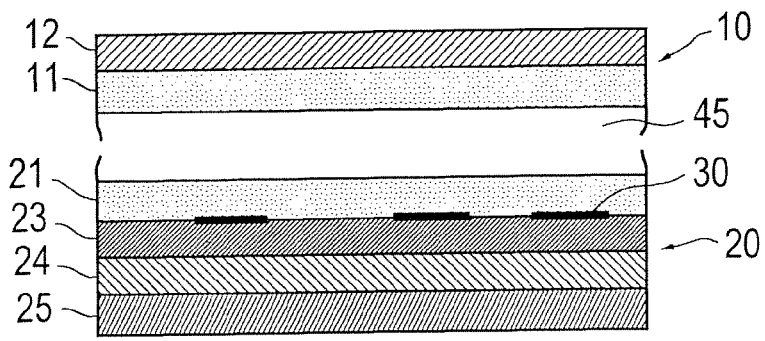

In example 7, the first packaging material 10 is the laminate formed of the transparent barrier film and the desiccant-containing resin film, and the second packaging material 20 is the laminate formed of the desiccant-containing resin film, the pattern printed film, the aluminum-evaporated film, and the transparent barrier film (FIG. 2(d)).

In example 8, the first packaging material 10 is the laminate formed of the transparent barrier film and the desiccant-containing resin film, and the second packaging material 20 is the laminate formed of the desiccant-containing resin film, the pattern printed film, the light-absorbing film, and the transparent barrier film (FIG. 2(d)).

In example 9, the first packaging material 10 is the laminate formed of the transparent barrier film and the desiccant-containing resin film, and the second packaging material 20 is a laminate formed of the sealant film, the pattern printed film, and the aluminum foil laminated film (FIG. 2(a)).

In example 10, the first packaging material 10 is the laminate formed of the transparent barrier film and the desiccant-containing resin film, and the second packaging material 20 is a laminate formed of the sealant film, the pattern printed film, and the aluminum-evaporated film (FIG. 2(a)).

In example 11, the first packaging material 10 is the laminate formed of the transparent barrier film and the desiccant-containing resin film, and the second packaging material 20 is a laminate formed of the sealant film, the pattern printed film, the aluminum-evaporated film, and the transparent barrier film (FIG. 2(c)).

In example 12, the first packaging material 10 is the laminate formed of the transparent barrier film and the desiccant-containing resin film, and the second packaging material 20 is a laminate formed of the sealant film, the pattern printed film, the light-absorbing film, and the transparent barrier film (FIG. 2(c)).

Each pair of laminates according to each of examples 1 to 12 are cut into a square shape 10 by 10 cm. The cut laminates are then superposed on one another as the first packaging material 10 and the second packaging material 20, and are heat sealed on four sides to make the packaging bag. Subsequently, a time (days) for the moisture absorptiveness of the desiccant of the desiccant-containing resin film to take to reach saturation is determined by measuring a time for the moisture absorption indicator pattern to take to appear under a temperature of 40° C. and a relative humidity of 90%.

TABLE 1

| | Time (Days) for Moisture Absorptiveness of Desiccant of Desiccant-Containing Resin Film to Take to Reach Saturation |
|---|---|
| Example 1 | 80 |
| Example 2 | 10 |
| Example 3 | 60 |
| Example 4 | 50 |
| Example 5 | 100 |
| Example 6 | 40 |
| Example 7 | 70 |
| Example 8 | 60 |
| Example 9 | 40 |
| Example 10 | 10 |
| Example 11 | 30 |
| Example 12 | 30 |

In the above examples, the packaging bag having the aluminum foil laminated film as the light-absorbing or light-reflective film 24 shows the superior sustainability of moisture absorption capability, and the packaging bag having the first and second packaging materials both containing the desiccant-containing resin film shows fine moisture absorption capability. The aluminum-evaporated film and the light-absorbing film each have a base material of a PET film, in which case the moisture absorptiveness of the desiccant reaches saturation faster compared to the case of the aluminum foil laminated film. Superiority in the sustainability of moisture absorption capability means that a longer time is required for the moisture absorptiveness of the desiccant to reach saturation. The sustainability of moisture absorption capability of the desiccant can be adjusted by adjusting an amount of the desiccant contained in the packaging bag.

The saturation reaching time of the moisture absorptiveness of desiccant of the desiccant-containing resin film is acceptable if the time is equal to or longer than a dry state maintenance time required for a stored article. When moisture-proof capability higher than that ensuring saturation times of the above examples is required, the higher moisture-proof capability is achieved by increasing the desiccant content of desiccant-containing resin of the desiccant-containing resin film, and increasing the thickness of the polyolefin resin film overlaid on the desiccant-containing resin or enhancing the capability of the transparent barrier film.

In the above embodiments, each of the transparent barrier film 12, the pattern printed film 23, the desiccant-containing resin films 11 and 21, etc., is depicted as a single layer in FIGS. 2(*a*) to 2(*d*) and 4(*a*) to 4(*d*). This single layer includes a film overlaid thereon by the coextrusion process, etc. When an oxygen barrier property, a gas barrier property, oil resistance, etc., is required, therefore, a proper resin may be selected and overlaid on the single layer by the coextrusion process.

The packaging bag of the present invention achieves a saturation reaching time of moisture absorptiveness of the desiccant of 100 days or more.

INDUSTRIAL APPLICABILITY

The packaging bag of the present invention is a packaging bag for storing an article need to be kept in a dry state, and is effective as a packaging material for use in storing a food, electronic component, medicine, book, etc. The drying agent with a moisture absorption indicator function according to the present invention can be placed in a container that stores a food, electronic component, medicine, book, etc., to be used as a drying agent.

EXPLANATIONS OF REFERENCE NUMERALS

1 Moisture absorbent sheet
2 Moisture-absorbing humidity indicator
3 Barrier film
4 Bag
6 Hollow container
7 Inner container
7*a* Synthetic zeolite
8 Cap
10 First packaging material
11 Desiccant-containing resin film
12 Transparent barrier film
13 Sealant film
20 Second packaging material
21 Desiccant-containing resin film
22 Thermoplastic resin film
23 pattern printed film
24 Light-reflective film or light-absorbing film
25 Transparent barrier film
30 Moisture absorption indicator pattern
40 Heat seal portion
45 Space
61 Transparent desiccant film (main desiccant layer)
64 Moisture permeable film
65 Bag-like portion
66 Silica gel
70 Indicator film layer
71 Moisture-absorbing film
73 Pattern printed layer
75 Barrier film
76 Moisture permeability control film
80 Moisture absorption indicator pattern
75 Barrier film
76 Moisture permeability control film
A Article

The invention claimed is:

1. A drying agent with a moisture absorption indicator function, characterized in that the drying agent comprises:
   an indicator film layer including a barrier film, a pattern printed layer having a moisture absorption indicator pattern printed thereon, and a moisture-absorbing film becoming transparent due to moisture absorption, the pattern printed layer and moisture-absorbing film being laminated in this order on the barrier film;
   a main desiccant layer; and
   a moisture permeable film, the main desiccant layer and the moisture permeable film being provided on the moisture-absorbing film of the indicator film layer.

2. The drying agent with a moisture absorption indicator function according to claim 1, characterized in that a space is formed between the main desiccant layer and the moisture-absorbing film to provide a bag-like portion.

3. The drying agent with a moisture absorption indicator function according to claim 1, characterized in that the main desiccant layer comprises a transparent desiccant film or a transparent desiccant molded body.

4. The drying agent with a moisture absorption indicator function according to claim 1, characterized in that:
   the main desiccant layer comprises a granular or tabular desiccant or a deliquescent desiccant; and
   the moisture permeable film and the moisture-absorbing film are sealed together at peripheries thereof to form a bag-like portion that encloses therewithin the granular or tabular desiccant or the deliquescent desiccant.

5. The drying agent with a moisture absorption indicator function according to claim 1, characterized in that the moisture-absorbing film comprises a laminate formed of a desiccant-containing resin layer and a thermoplastic resin.

6. The drying agent with a moisture absorption indicator function according to claim 1, characterized in that the moisture-absorbing film contains at least one desiccant selected from zeolite, silica gel, and alumina.

7. The drying agent with a moisture absorption indicator function according to claim 1, characterized in that a moisture permeability control film is overlaid on the moisture-absorbing film, the moisture permeability control film controlling the time that elapses before moisture absorptiveness of the moisture-absorbing film reaches saturation.

8. The drying agent with a moisture absorption indicator function according to claim 7, characterized in that a space is formed between the main desiccant layer and the moisture permeability control film to provide a bag-like portion.

9. The drying agent with a moisture absorption indicator function according to claim 7, characterized in that:

the main desiccant layer comprises a granular or tabular desiccant or a deliquescent desiccant; and the moisture permeable film and the moisture permeability control film are sealed together at peripheries thereof to form a bag-like portion that encloses therewithin the granular or tabular desiccant or the deliquescent desiccant.

10. The drying agent with a moisture absorption indicator function according to claim 7, characterized in that the moisture permeability control film is a transparent film and has a water vapor transmission rate of 0.01 to 5,000 g/m2/day.

* * * * *